United States Patent
Taniguchi et al.

(10) Patent No.: US 6,813,551 B2
(45) Date of Patent: Nov. 2, 2004

(54) CONTROL APPARATUS FOR CONTINUOUSLY VARIABLE TRANSMISSION

(75) Inventors: Hiroji Taniguchi, Okazaki (JP); Katsumi Kono, Toyota (JP); Kenji Matsuo, Toyota (JP); Masato Terashima, Toyota (JP); Hiroki Kondo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 91 days.

(21) Appl. No.: 10/355,144

(22) Filed: Jan. 31, 2003

(65) Prior Publication Data

US 2003/0149520 A1 Aug. 7, 2003

(30) Foreign Application Priority Data

Feb. 4, 2002 (JP) ........................................ 2002-026535
Apr. 5, 2002 (JP) ........................................ 2002-103240

(51) Int. Cl.$^7$ ........................ B60K 41/12; B60K 41/08; F16H 55/54
(52) U.S. Cl. ............................. 701/59; 701/58; 474/28
(58) Field of Search .............................. 701/59, 58, 51, 701/62, 66; 474/18, 28, 12, 29; 192/3.3; 477/48, 49, 38, 39, 154, 45, 155, 43, 46

(56) References Cited

U.S. PATENT DOCUMENTS

| | | | | |
|---|---|---|---|---|
| 4,458,318 A | * | 7/1984 | Smit et al. ..................... | 701/51 |
| 4,515,041 A | * | 5/1985 | Frank et al. ................... | 477/43 |
| 4,522,086 A | * | 6/1985 | Haley ............................ | 477/39 |
| 4,707,789 A | * | 11/1987 | Downs et al. ................. | 701/58 |
| 4,717,368 A | * | 1/1988 | Yamaguchi et al. .......... | 474/28 |
| 4,722,719 A | * | 2/1988 | Klopfenstein ................. | 474/28 |
| 4,733,582 A | * | 3/1988 | Eggert et al. ................. | 477/38 |
| 4,790,216 A | * | 12/1988 | Eggert et al. ................. | 477/38 |

FOREIGN PATENT DOCUMENTS

| | | |
|---|---|---|
| JP | 7-4508 | 1/1995 |
| JP | 9-210189 | 8/1997 |
| JP | 11-182667 | 7/1999 |

* cited by examiner

*Primary Examiner*—Tan Q. Nguyen
*Assistant Examiner*—Dalena Tran
(74) *Attorney, Agent, or Firm*—Oliff & Berridge, PLC

(57) ABSTRACT

Estimated change in operating fluid volume within a primary fluid chamber over a predetermined period of time during gear change operation is calculated using a physical model. On the other hand, detected change in operating fluid volume within the primary fluid chamber over this predetermined period of time is calculated. Then the deviation of the detected change from the estimated change is calculated, and learning and correction of the difference between the characteristic stored in an electronic control unit and that of an actual flow control unit are performed based on this deviation.

58 Claims, 12 Drawing Sheets

CONTROL APPARATUS FOR CONTINUOUSLY VARIABLE TRANSMISSION

BACKGROUND OF THE INVENTION a) Field of the Invention

The present invention relates to a control apparatus for a continuously variable transmission, and more particularly, to an apparatus for controlling the gear ratio of the continuously variable transmission by use of a flow control unit.

b) Description on the Related Art

Continuously variable transmissions have hitherto been used as transmissions for automobiles and so on. With a belt type continuously variable transmission, a V belt is passed around the primary pulley on the engine side and the secondary pulley on the wheel side, thus continuously changing the gear ratio by changing the groove widths of the primary and secondary pulleys.

Driving force required to change the gear ratio of this transmission is generally produced by hydraulic pressure from a hydraulic actuator. The flow control unit as shown, for example, in Japanese Patent Laid-open publication No. Hei11-182667 is employed as a hydraulic actuator. The flow control unit shown in Japanese Patent Laid-open publication No. Hei11-182667 comprises a shift-up flow control valve and a shift-down flow control valve which are separate from each other and further comprises shift-up and shift-down solenoid valves designed respectively to control the shift-up and shift-down flow control valves.

During shift up, duty control is performed in which the shift up shift-up flow control valve is turned on and off repeatedly, thus allowing operating fluid to flow from the shift-up flow control valve to the primary pulley's fluid chamber. This causes the turning radius of the portion of the primary pulley around which the V belt is passed to increase, thus allowing shift up. During shift down, on the other hand, duty control is performed in which the shift-down flow control valve is turned on and off repeatedly, thus allowing operating fluid to flow from the shift-down flow control valve through the primary pulley's fluid chamber. This causes the turning radius of the portion of the primary pulley around which the V belt is passed to decrease, thus allowing shift down. Here, the orifice area within the flow control valves is determined based on the duty ratio of the solenoid valves. A characteristic of the duty ratio with respect to the orifice area is stored in advance in an electronic control unit, and the duty ratio of the solenoid valves is calculated based on this characteristic.

Since manufacturing variation occurs in flow control and solenoid valves, variation also occurs in that characteristic of the duty ratio with respect to the orifice area. Consequently, the characteristic of the duty ratio with respect to the orifice area stored in the electronic control unit does not necessarily agree with the actual characteristic of the flow control unit for the duty ratio with respect to the orifice area, thus resulting in difference in characteristic between the two. Consequently, an error occurs between the desired and actual flow rates, thus aggravating the ability of actual gear ratio to follow desired gear ratio.

Additionally, a continuously variable transmission achieves change gear control by determining target input rotation speed based, for example, on required amount of driving force such as an accelerator opening amount and driving conditions such as vehicle speed or operation by the driver and by controlling gear ratio such that actual input rotation speed agrees with target input rotation speed. A change gear control device which controls the gear ratio of a continuously variable transmission such that actual input rotation speed agrees with target input rotation speed is included in Japanese Patent Laid-Open Publication No. Hei 7-4508. With this conventional technology, feedforward and feedback manipulated variables are added, a control value appropriate for manipulated variable is treated as a shift actuator manipulated variable, a feedback manipulated variable which provides a near-zero deviation of actual input rotation speed from target speed is stored as a correction manipulated variable and this correction manipulated variable is added to feedforward and feedback manipulated variables. This allows learning and correction of changes in feedforward characteristic caused by individual differences between continuously variable transmissions and deterioration over time.

With conventional continuously variable transmissions, however, there has been a problem of shift characteristic aggravation as a result of variation in control value if the feedforward manipulated variable is reflected in an actuator manipulated variable before learning of actuator manipulated variable is complete.

SUMMARY OF THE INVENTION

The present invention was conceived in view of the above problems, and an advantage of the present invention is that it provides a control apparatus for a continuously variable transmission which improves the ability of the actual gear ratio to follow a desired gear ratio.

Another advantage of the present invention is that it provides a control apparatus for a continuously variable transmission which ensures reduced variation in change gear control value before learning of actuator manipulated variable is complete.

In order to achieve the advantages, according to a first aspect of the present invention there is provided a control apparatus for a continuously variable transmission which controls the gear ratio by using an operating fluid supply and discharge device to change the flow rate of operating fluid entering and leaving a gear change mechanism, the control apparatus comprising a hydraulic control signal calculation device which calculates a hydraulic control signal output to the operating fluid supply and discharge device, a fluid volume detection device which detects a change in operating fluid volume within the gear change mechanism over a predetermined period of time during which a gear change operation is in progress, a fluid volume estimation device which estimates a change in operating fluid volume within the gear change mechanism over the predetermined period of time, based on the hydraulic control signal, and a correction device which corrects the hydraulic control signal to flow control output characteristic map, based on the deviation of the value detected by the fluid volume detection device from the value estimated by the fluid volume estimation device.

According to the present invention, since the hydraulic control signal to flow control output characteristic map for the operating fluid supply and discharge device is corrected based on the deviation of the value detected by the fluid volume detection device from the value estimated by the fluid volume estimation device, it is possible to accurately learn and correct any difference between the characteristic map stored in the electronic control unit and the actual characteristic of the operating fluid supply and discharge device. Consequently, error between desired and actual flow rates can be minimized, thus providing improved ability of actual gear ratio to follow desired gear ratio.

In the present invention, the fluid volume estimation device may include a differential pressure detection device which detects the difference between operating fluid pressures anterior and posterior to the operating fluid supply and discharge device, the fluid volume estimation device estimating a change in operating fluid volume within the gear change mechanism, based on the hydraulic control signal and on the value detected by the differential pressure detection device. The fluid volume estimation device may estimate a change in operating fluid volume within the gear change mechanism, based on the hydraulic control signal, on the value detected by the differential pressure detection device and on a dynamic characteristic model for the hydraulic control signal with respect to the flow control output.

By estimating change in operating fluid volume within the gear change mechanism based on the dynamic characteristic model for the hydraulic control signal and the flow control output, it is possible to consider response delay of the operating fluid supply and discharge device and more accurately estimate change in operating fluid volume within the gear change mechanism. Consequently, the hydraulic control signal to flow control output characteristic map can be learned and corrected more accurately.

In the present invention, the correction device may correct the hydraulic control signal to flow control output characteristic map for the range of hydraulic control signal values used for estimation of a change in operating fluid volume by the fluid volume estimation device.

By correcting the hydraulic control signal to flow control output characteristic map for the range of hydraulic control signal values used for estimation of change in operating fluid flow rate, it is possible to perform accurate learning and correction even if the difference between the characteristic map stored in the electronic control unit and the actual characteristic of the operating fluid supply and discharge device changes in accordance with the hydraulic control signal.

In the present invention, the gear change mechanism may comprise a primary pulley to which driving torque is transferred from a prime mover, a secondary pulley which transfers driving torque to a load and a belt which is passed around the primary pulley and the secondary pulley, wherein the operating fluid supply and discharge device controls the gear ratio by changing the flow rate of operating fluid entering and leaving the primary pulley, wherein the control apparatus further includes a primary rotation speed detection device which detects the primary pulley rotation speed, a secondary rotation speed detection device which detects the secondary pulley rotation speed, an input torque detection device which detects input torque transferred to the primary pulley and a secondary pressure detection device which detects operating fluid pressure within the secondary pulley and wherein the differential pressure detection device detects the difference between operating fluid pressures anterior and posterior to the operating fluid supply and discharge device, based on the values detected by the primary rotation speed detection device, the secondary rotation speed detection device, the input torque detection device and the secondary pressure detection device.

By detecting the difference between operating fluid pressures anterior and posterior to the operating fluid supply and discharge device based on the primary pulley rotation speed, the secondary pulley rotation speed, input torque transferred to the primary pulley and operating fluid pressure within the secondary pulley, it is possible to do without the pressure sensor for detecting operating fluid pressure within the primary pulley, thus reducing costs.

In the present invention, the control apparatus may further comprise a gear ratio detection device which detects the gear ratio of the continuously variable transmission, wherein the fluid volume detection device detects a change in operating fluid volume within the gear change mechanism, based on the amount of change in the gear ratio over the predetermined period of time.

In the present invention, the predetermined period of time is preferably from the start of a gear change operation to the end of gear change operation.

In the present invention, the flow control output is preferably the orifice area of the operating fluid supply and discharge device.

In the present invention, the control apparatus may further comprise a gear ratio detection device which detects the gear ratio of the continuously variable transmission, wherein the fluid volume estimation device stops estimating a change in operating fluid volume within the gear change mechanism if the gear ratio falls outside a preset range. If gear ratio falls outside the set range, estimation of change in operating fluid volume within the gear change mechanism is stopped, thus preventing erroneous learning caused by gear ratio reaching the maximum or minimum ratio during learning and correction of the hydraulic control signal to flow control output characteristic map stored in the electronic control unit and ensuring more accurate learning and correction.

According to a second aspect of the present invention there is provided a control apparatus for a continuously variable transmission which controls gear ratio by using an operating fluid supply and discharge device to change the flow rate of operating fluid entering and leaving a gear change mechanism, the control apparatus comprising a hydraulic control signal calculation device which calculates a hydraulic control signal output to the operating fluid supply and discharge device, a fluid flow detection device which detects the flow rate of operating fluid entering and leaving the gear change mechanism at a predetermined timing during the gear change operation, a fluid flow estimation device which estimates the flow rate of operating fluid entering and leaving the gear change mechanism at the predetermined timing based on the hydraulic control signal, and a correction device which corrects a hydraulic control signal to flow control output characteristic map for the operating fluid supply and discharge device, based on the deviation of the value detected by the fluid flow detection device from the value estimated by the fluid flow estimation device. The correction device may further correct a hydraulic control signal value when flow begins to occur at the operating fluid supply and discharge device, based on the hydraulic control signal and the value detected by the fluid flow detection device. By correcting the hydraulic control signal value when flow begins to occur at the operating fluid supply and discharge device based on the hydraulic control signal and the value detected by the fluid flow detection device, it is possible to accurately learn and correct the hydraulic control signal value when flow begins to occur at the operating fluid supply and discharge device. Consequently, it is possible to perform accurate gear ratio control using the operating fluid supply and discharge device when gear ratio is changed only slightly, thus minimizing gear ratio hunting in which shift up and shift down are repeated to maintain gear ratio at a desired level.

In the present invention, the correction device may correct a hydraulic control signal value when flow begins to occur at the operating fluid supply and discharge device, based on the hydraulic control signal, the value detected by the fluid flow detection device and a dynamic characteristic model for the hydraulic control signal with respect to the flow control output. By correcting the hydraulic control signal value when flow begins to occur at the operating fluid supply and discharge device based on the dynamic characteristic model for the hydraulic control signal with respect to the flow control output, it is possible to consider response delay of the operating fluid supply and discharge device and more accurately learn and correct the hydraulic control signal value when flow begins to occur at the operating fluid supply and discharge device. Consequently, gear ratio hunting can be further minimized.

In the present invention, the fluid flow estimation device may include a differential pressure detection device detecting the difference between operating fluid pressures anterior and posterior to the operating fluid supply and discharge device, the fluid flow estimation device estimating the flow rate of operating fluid entering and leaving the gear change mechanism, based on the hydraulic control signal and the value detected by the differential pressure detection device. The fluid flow estimation device may estimate the flow rate of operating fluid entering and leaving the gear change mechanism, based on the hydraulic control signal, the value detected by the differential pressure detection device and a dynamic characteristic model for the hydraulic control signal with respect to the flow control output.

In the present invention, the correction device may correct the hydraulic control signal to flow control output characteristic map for the hydraulic control signal value used for estimation of flow rate of operating fluid by the fluid flow estimation device.

In the present invention, the gear change mechanism may comprise a primary pulley to which driving torque is transferred from a prime mover, a secondary pulley which transfers driving torque to load and a belt which is passed around the primary pulley and the secondary pulley, wherein the operating fluid supply and discharge device controls gear ratio by changing the flow rate of operating fluid entering and leaving the primary pulley, wherein the control apparatus further has a primary rotation speed detection device which detects the primary pulley rotation speed, a secondary rotation speed detection device which detects the secondary pulley rotation speed, an input torque detection device which detects input torque transferred to the primary pulley and a secondary pressure detection device which detects operating fluid pressure within the secondary pulley and wherein the differential pressure detection device detects the difference between operating fluid pressures anterior and posterior to the operating fluid supply and discharge device, based on the values detected by the primary rotation speed detection device, the secondary rotation speed detection device, the input torque detection device and the secondary pressure detection device.

In the present invention, the control apparatus may further comprise a gear ratio detection device which detects the gear ratio of the continuously variable transmission, wherein the fluid flow detection device detects the flow rate of operating fluid entering and leaving the gear change mechanism, based on the amount of change in gear ratio per unit time at the predetermined timing.

In the present invention, the flow control output is preferably the orifice area of the operating fluid supply and discharge device.

In the present invention, the hydraulic control signal calculation device may include a feedforward control device which calculates a feedforward manipulated variable to be sent to the operating fluid supply and discharge device, based on the hydraulic control signal to flow control output characteristic map and wherein control by the feedforward control device is disabled until the correction device completes correction of the hydraulic control signal to flow control output characteristic map.

In the present invention, the hydraulic control signal calculation device may include a feedforward control device which calculates a feedforward manipulated variable to be sent to the operating fluid supply and discharge device based on the hydraulic control signal to flow control output characteristic map and a feedback control device which calculates a feedback manipulated variable to be sent to the operating fluid supply and discharge device and wherein control by the feedforward control device is disabled and control by the feedback control device is enabled until the correction device completes correction of the hydraulic control signal to flow control output characteristic map.

In the present invention, the hydraulic control signal calculation device may include a feedforward control device which calculates a feedforward manipulated variable to be sent to the operating fluid supply and discharge device based on the hydraulic control signal to flow control output characteristic map, a feedback control device which calculates a feedback manipulated variable to be sent to the operating fluid supply and discharge device and a weight setting device which specifies weights for feedforward and feedback manipulated variables and wherein the weight for a feedforward manipulated variable is increased in accordance with the progress of correction of the hydraulic control signal to flow control output characteristic map by the correction device.

In the present invention, control by the feedforward control device may be disabled under those operating conditions to which correction of the hydraulic control signal to flow control output characteristic map by the correction device is not applicable.

In the present invention, the control apparatus may further comprise a fluid temperature measurement device which measures operating fluid temperature, wherein control by the feedforward control device is disabled under those operating fluid temperatures to which correction of the hydraulic control signal to flow control output characteristic map by the correction device is not applicable.

In the present invention, the hydraulic control signal calculation device may include a feedback control device which calculates a feedback manipulated variable to be sent to the operating fluid supply and discharge device and wherein feedback gain for the feedback control device is changed in accordance with the progress of correction of the hydraulic control signal to flow control output characteristic map by the correction device.

In the present invention, a feedback gain for the feedback control device equal to or lower than a predetermined value may be specified under those operating conditions to which correction of the hydraulic control signal to flow control output characteristic map by the correction device is not applicable.

In the present invention, the control apparatus may further comprise a fluid temperature measurement device which measures operating fluid temperature, wherein a feedback gain for the feedback control device equal to or lower than a predetermined value is specified under those operating fluid temperatures to which correction of the hydraulic control signal to flow control output characteristic map by the correction device is not applicable.

According to a third aspect of the present invention there is provided a control apparatus for a continuously variable transmission which controls the gear ratio by using an operating fluid supply and discharge device to change the flow rate of operating fluid, the control apparatus comprising a feedforward control device which uses a physical model to calculate a feedforward manipulated variable to be sent to the operating fluid supply and discharge device, and a correction device which corrects the physical model from control results and repeats correction of the physical model, wherein control by the feedforward control device is disabled until correction of the physical model is complete.

According to a fourth aspect of the present invention there is provided a control apparatus for a continuously variable transmission which controls gear ratio by using an operating fluid supply and discharge device to change the flow rate of operating fluid, the control apparatus comprising a feedforward control device which uses a physical model to calculate a feedforward manipulated variable to be sent to the operating fluid supply and discharge device, a correction device which corrects the physical model from control results and repeats correction of the physical model, and a feedback control device which calculates a feedback manipulated variable to be sent to the operating fluid supply and discharge device, wherein control by the feedforward control device is disabled and control by the feedback control device is enabled until correction of the physical model is complete.

According to a fifth aspect of the present invention there is provided a control apparatus for a continuously variable transmission which controls gear ratio by using an operating fluid supply and discharge device to change the flow rate of operating fluid, the control apparatus comprising a feedforward control device which uses a physical model to calculate a feedforward manipulated variable to be sent to the operating fluid supply and discharge device, a correction device which corrects the physical model from control results and repeats correction of the physical model, a feedback control device which calculates a feedback manipulated variable to be sent to the operating fluid supply and discharge device, and a weight setting device which specifies weights for feedforward and feedback manipulated variables, wherein the weight for feedforward manipulated variable is increased in accordance with the progress of correction of the physical model.

In the present invention, control by the feedforward control device may be disabled under those operating conditions to which the physical model is not applicable.

In the present invention, the control apparatus may further comprise a fluid temperature measurement device which measures operating fluid temperature, wherein control by the feedforward control device is disabled under those operating fluid temperatures to which the physical model is not applicable.

According to a sixth aspect of the present invention, there is provided a control apparatus for a continuously variable transmission which controls gear ratio by using an operating fluid supply and discharge device to change the flow rate of operating fluid, the control apparatus comprising a feedback control device which uses a physical model to calculate a feedback manipulated variable to be sent to the operating fluid supply and discharge device, and a correction device which corrects the physical model from control results and repeats correction of the physical model; wherein a feedback gain for the feedback control device is changed in accordance with the progress of correction of the physical model.

In the present invention, a feedback gain for the feedback control device equal to or lower than a predetermined value may be specified under those operating conditions to which the physical model is not applicable.

In the present invention, the control apparatus may further comprise a fluid temperature measurement device which measures operating fluid temperature, wherein a feedback gain for the feedback control device equal to or lower than a predetermined value is specified under those operating fluid temperatures to which the physical model is not applicable.

In the present invention, preferably, the operating fluid supply and discharge device includes a flow control valve and solenoid valve, wherein a solenoid valve control value corresponding to the manipulated variable allows the solenoid valve to change the orifice area of the flow control valve, thus changing operating fluid flow rate, wherein the physical model is a model which brings the solenoid valve control value into correspondence with operating fluid flow rate and wherein the correction device corrects the physical model from the difference between actual operating fluid flow rate obtained through control results and flow rate of the physical model and repeats correction of the physical model.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Preferred embodiments of the present invention will now be described with reference to the drawings.

(1) First Embodiment

Figure 1:
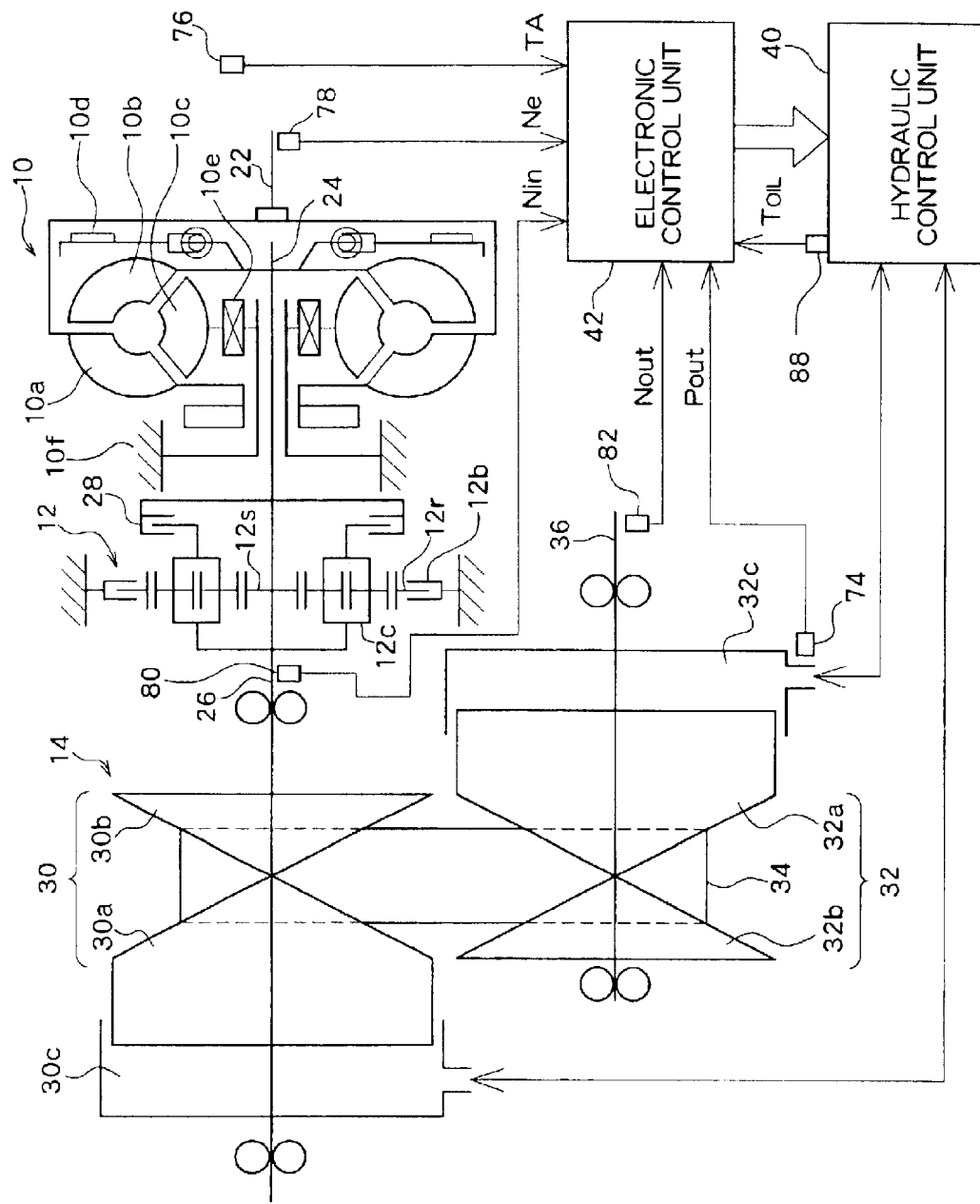
FIG. 1 illustrates the configuration of a power transmission device for vehicles including a continuously variable transmission control device associated with embodiments of the present invention.

FIG. 1 associated with the first embodiment of the present invention shows the overall configuration in which the present invention is applied to a belt type continuously variable transmission control, and this embodiment comprises a torque converter 10 which is coupled to an engine output shaft 22, a forward/backward changeover device 12 and a belt type continuously variable transmission 14, a hydraulic control unit 40 which controls the gear ratio of the transmission 14 and an electronic control unit 42 which controls hydraulic pressure of the hydraulic control unit 40. Driving torque produced by an engine which serves as a prime mover is transferred to an unillustrated drive wheel via the torque converter 10, the forward/backward changeover device 12, the belt type continuously variable transmission 14 and an unillustrated differential gear.

The torque converter 10 comprises a pump impeller 10a which is coupled to the engine output shaft 22, a turbine liner 10b which is coupled to a torque converter output shaft 24 and to which driving torque is transferred from the pump impeller 10a via fluid, a stator 10c which is secured to a fixed housing 10f via a one-way clutch 10e and lockup clutch 10d which fastens the pump impeller 10a to the turbine liner 10b via a damper.

The forward/backward changeover device 12 comprises a double planetary gear device and has a sun gear 12s, carriers 12c and a ring gear 12r. The sun gear 12s is coupled to the torque converter output shaft 24. The carriers 12c are coupled to the torque converter output shaft 24 via a clutch 28 and to a belt type continuously variable transmission input shaft 26. The ring gear 12r is coupled to a brake 12b.

The belt type continuously variable transmission 14 comprises a primary pulley 30 which is coupled to the input shaft 26, a secondary pulley 32 which is coupled to an output shaft 36 and a V belt 34 which is passed around the primary pulley 30 and the secondary pulley 32 and transfers torque, which was transferred from the input shaft 26 to the primary pulley 30, to the output shaft 36 via the V belt 34 and the secondary pulley 32.

The primary pulley 30 is comprised of a primary moving pulley half body 30a which can move in the direction of the input shaft 26 and a primary stationary pulley half body 30b. Similarly, the secondary pulley 32 is comprised of a secondary moving pulley half body 32a which can move in the direction of the output shaft 36 and a secondary stationary pulley half body 32b. The primary moving pulley half body 30a moves in the direction of the input shaft 26 by hydraulic pressure supplied to a primary fluid chamber 30c. This causes the turning radiuses of the portions of the primary pulley 30 and the secondary pulley 32 around which the V belt 34 is passed to change, thus continuously changing the gear ratio of the belt type continuously variable transmission 14. Additionally, belt pinching pressure is applied to the V belt 34 by hydraulic pressure supplied to a secondary fluid chamber 32c provided in the secondary moving pulley half body 32a. This minimizes slipping between the pulleys and the V belt 34.

Hydraulic pressure supplied to the primary fluid chamber 30c and the secondary fluid chamber 32c of the belt type continuously variable transmission 14 is supplied by the hydraulic control unit 40, and that pressure is controlled by the electronic control unit 42.

Signals from various sensors are fed to the electronic control unit 42, including a throttle opening amount sensor 76 which detects the throttle opening amount TA, an engine rotation speed sensor 78 which detects engine rotation speed Ne, an input shaft rotation speed sensor 80 which detects the input shaft 26's rotation speed $N_{in}$, an output shaft rotation speed sensor 82 which detects rotation speed $N_{out}$ of the output shaft 36, a fluid temperature sensor 88 which detects the temperature $T_{fluid}$ of operating fluid within the hydraulic control unit 40 and a pressure sensor 74 which detects the pressure $P_{out}$ of operating fluid within the secondary fluid chamber 32c. The electronic control unit 42 processes the above signals and controls hydraulic pressure supplied to the primary fluid chamber 30c and the secondary fluid chamber 32c of the belt type continuously variable transmission 14 based on processing results.

Figure 2:
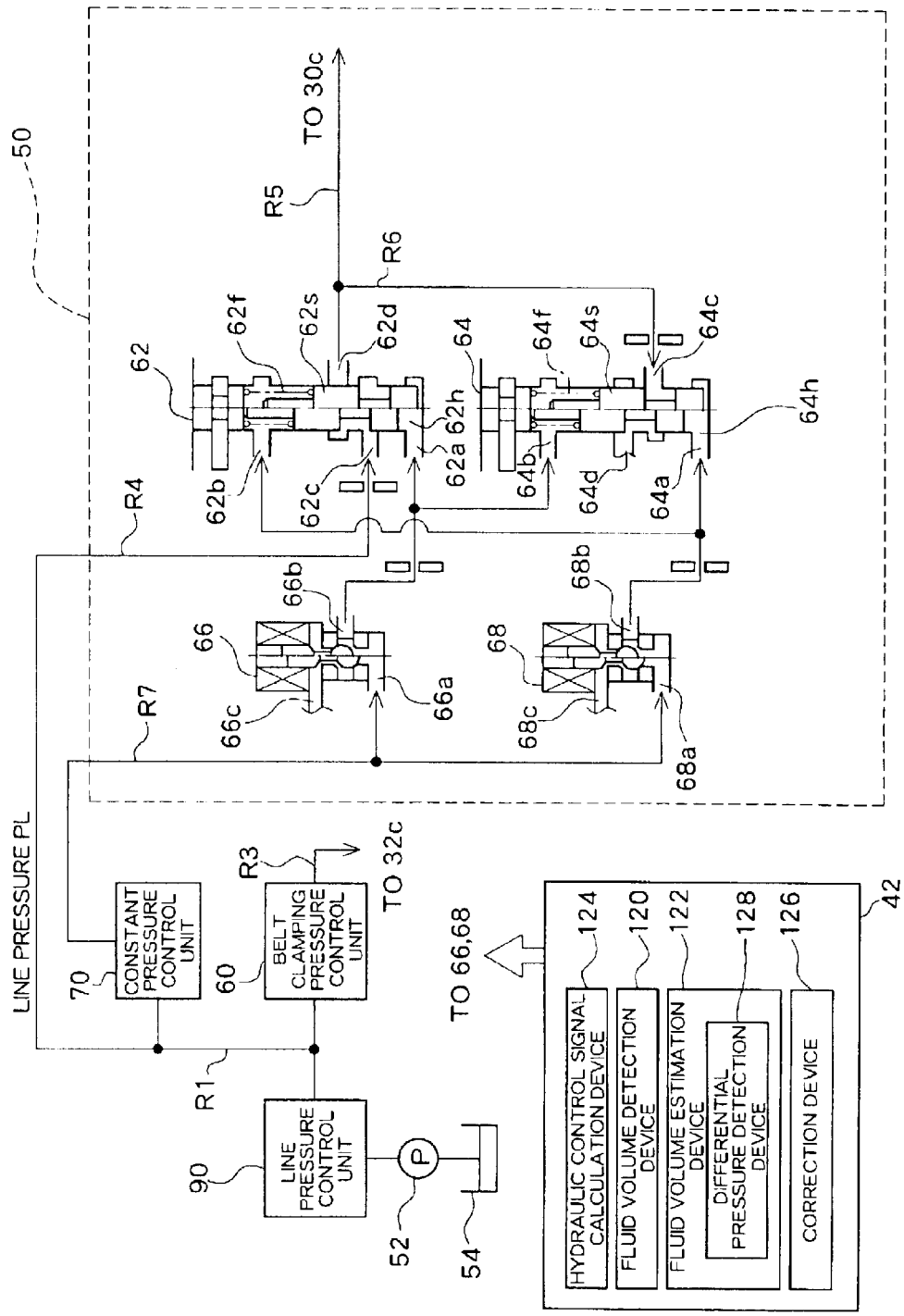
FIG. 2 is a diagrammatic sketch of the configuration of hydraulic and electronic control units used in the embodiments of the present invention.

Next, the main configuration of the hydraulic control unit 40 is described using FIG. 2.

A line pressure control unit 90 comprises an unillustrated linear solenoid valve and outputs line pressure PL to a fluid passage R1 by regulating hydraulic pressure from a pump 52 which is rotated and driven by the engine. A belt clamping pressure control unit 60 supplies hydraulic pressure, obtained by regulating line pressure PL within the fluid passage R1 in accordance with torque of the input shaft 26, to the secondary fluid chamber 32c via a fluid passage R3. This provides belt clamping pressure for minimizing slipping taking place between the pulleys and the V belt 34. Additionally, a constant pressure control unit 70 is provided within the fluid passage R1 which is used to regulate line pressure PL and output constant pressure. Hydraulic pressure maintained constant by the constant pressure control unit 70 is supplied to a shift-up solenoid valve 66 and a shift-down solenoid valve 68, which will be discussed later, via a fluid passage R7.

A flow control unit 50, provided as an operating fluid supply and discharge device, controls the flow rate of operating fluid entering and leaving the primary fluid chamber 30c of the primary pulley 30 and comprises a shift-up flow control valve 62, a shift-down flow control valve 64, the shift-up solenoid valve 66 and the shift-down solenoid valve 68 which supply control pressure respectively to the shift-up flow control valve 62 and the shift-down flow control valve 64. The shift-up flow control valve 62 has four ports 62a, 62b, 62c and 62d, a spool 62s which moves up and down in FIG. 2, a spring 62f which pushes the spool 62s downward in FIG. 2 and a control chamber 62h to which control pressure is supplied. The shift-up solenoid valve 66 has three ports 66a, 66b and 66c. When the shift-up solenoid valve 66 is on (as shown in the right-hand side in FIG. 2), the ports 66a and 66b communicate with each other. The shift-up solenoid valve 66 employs duty control, in which the valve is turned on and off repeatedly, to control hydraulic pressure within the fluid passage R7 which is maintained at a constant level through regulation such that hydraulic pressure remains in the range from atmospheric pressure to this constant level and supplies hydraulic pressure to the control chamber 62h from the port 62a of the shift-up flow control valve 62 as control pressure. Note that when the shift-up solenoid valve 66 is off (as shown in the left-hand side in FIG. 2), the ports 66b and 66c communicate with each other, thus causing hydraulic pressure within the control chamber 62h to be discharged from the port 66c to a reservoir 54 where hydraulic pressure is reduced to atmospheric pressure.

When control pressure from the shift-up solenoid valve 66 is supplied to the control chamber 62h from the port 62a of the shift-up flow control valve 62, this control pressure pushes the spool 62s upward in FIG. 2. On the other hand, the spool 62s is pushed downward in FIG. 2 by the spring 62f, as a result of which the line pressure PL, supplied from the port 62c via a fluid passage R4, is regulated through balance between these forces and supplied to the primary fluid chamber 30c from the port 62d via a fluid passage R5.

Similarly, the shift-down flow control valve 64 has four ports 64a, 64b, 64c and 64d, a spool 64s which moves up and down in FIG. 2, a spring 64f which pushes the spool 64s downward in FIG. 2 and a control chamber 64h to which control pressure is supplied. The shift-down solenoid valve 68 has three ports 68a, 68b and 68c. When the shift-down solenoid valve 68 is on (as shown in the right-hand side in FIG. 2), the ports 68a and 68b communicate with each other. The shift-down solenoid valve 68 employs duty control, in which the valve is turned on and off repeatedly, to control hydraulic pressure within the fluid passage R7 which is maintained at a constant level through regulation such that hydraulic pressure remains in the range from atmospheric pressure to this constant level and supplies hydraulic pressure to the control chamber 64h from the port 64a of the shift-down flow control valve 64 as control pressure. Note that when the shift-down solenoid valve 68 is off (as shown in the left-hand side in FIG. 2), the ports 68b and 68c communicate with each other, thus causing hydraulic pressure within the control chamber 64h to be discharged from the port 68c to the reservoir 54 where hydraulic pressure is reduced to atmospheric pressure.

When control pressure from the shift-down solenoid valve 68 is supplied to the control chamber 64h from the port 64a of the shift-down flow control valve 64, this control pressure pushes the spool 64s upward in FIG. 2. On the other hand, the spool 64s is pushed downward in FIG. 2 by the spring 64f, as a result of which the communication status between the port 64c and the port 64d is controlled through balance between these forces and hydraulic pressure supplied to the primary fluid chamber 30c is discharged from the port 64d to the reservoir 54 via the fluid passage R5.

Next, the main configuration of the electronic control unit 42 shown in FIG. 2 is described.

A hydraulic control signal calculation device 124 is provided within the electronic control unit 42 which calculates duty ratios for duty control command values sent to the shift-up solenoid valve 66 and the shift-down solenoid valve 68. The hydraulic control signal calculation device 124 calculates a duty ratio corresponding to the orifice area required to obtain a desired gear ratio based on a duty ratio to orifice area characteristic map which is stored in the electronic control unit 42 as a hydraulic control signal to flow control output characteristic map for the flow control unit 50. In this embodiment, the electronic control unit 42 further comprises a fluid volume detection device 120 which calculates change in operating fluid volume in the primary fluid chamber 30c, a fluid volume estimation device 122 which estimates change in operating fluid volume in the primary fluid chamber 30c and a correction device 126 which corrects the duty ratio to orifice area characteristic stored in the electronic control unit 42. The fluid volume estimation device 122 comprises a differential pressure detection device 128 which calculates the difference between operating fluid pressures anterior and posterior to the shift-up flow control valve 62 and the shift-down flow control valve 64.

Figure 3:
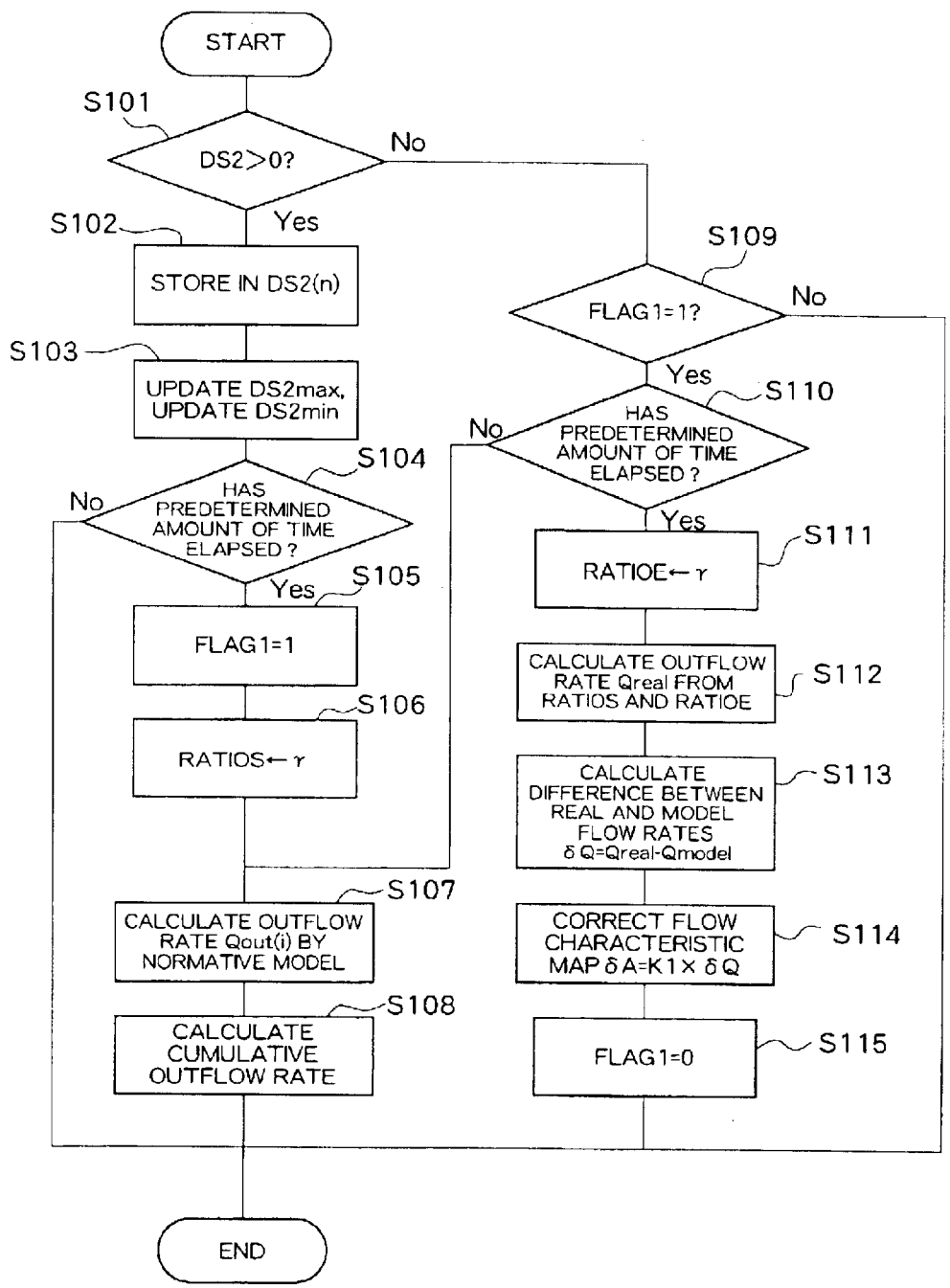
FIG. 3 is a flowchart showing the flow characteristic correction routine used in the first embodiment of the present invention.
Figure 4:
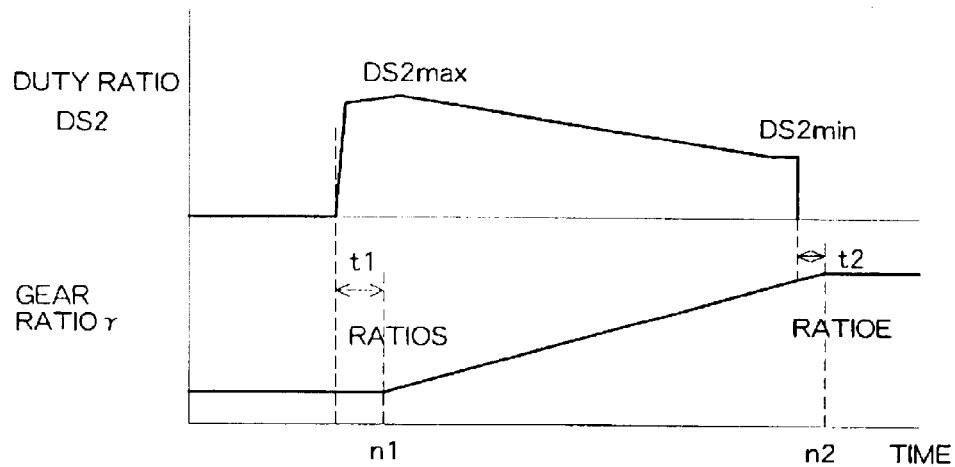
FIG. 4 is a timing chart showing changes in duty ratio and gear ratio over time during shift down.

Next, a flow characteristic correction routine executed within the electronic control unit 42 is described using the flowchart and the timing chart shown respectively in FIGS. 3 and 4. Execution of this flow characteristic correction routine is repeated at predetermined intervals. Note that only shift down is described here and description of shift up is omitted. However, shift up can also be achieved by a similar routine.

First, in step (hereinafter S) 101, judgment is made as to whether a duty control command value is output to the shift-down solenoid valve 68. If the judgment result in S101 is No, control goes to S109 which will be discussed later. On the other hand, when the judgment result in S101 is Yes, control goes to S102 where the duty ratio for the duty control command value at the current sample time n is stored in a memory DS2(n). Next, control goes to S103 where a maximum duty ratio DS2max and a minimum duty ratio DS2min used when a duty control command value is output are updated. To be more specific, if the duty ratio DS2(n) is larger than the current DS2max, the DS2max value is updated to DS2(n) while if the duty ratio DS2(n) is smaller than the current DS2min, the DS2min value is updated to DS2(n).

In S104, judgment is made as to whether the predetermined amount of time t1 has elapsed since duty control command value began to be output to the shift-down solenoid valve 68. Here, the predetermined amount of time t1 is specified experimentally based on time delay from when output of duty control command value begins to when the primary moving pulley half body 30a begins to move and is a function of operating fluid temperature. If the judgment result in S104 is No, execution of this routine is terminated based on the conclusion that shift down has not been initiated. On the other hand, when the judgment result in S104 is Yes, control goes to S105 where the Flag 1 is set to "1" based on the conclusion that shift down has been initiated and then control goes to S106.

In S106, the gear ratio RATIOS at the shift down start time n1 is stored. Then, control goes to S107 where the fluid volume estimation device 122 uses the physical model shown below to calculate the estimated flow rate $Q_{out}(n)$ from the primary fluid chamber 30c at the time n. Here, the estimated flow rate $Q_{out}(n)$ can be expressed by the equation (1).

[Equation 1]

$$Q_{out}(n) = C \times A(n) \times (2 \times \delta P(n)/\rho)^{0.5} \qquad (1)$$

where C is the flow coefficient, A(n) the orifice area within the shift-down flow control valve 64 at the time n, ρ the fluid density and δP(n) the difference between operating fluid pressures anterior and posterior to the shift-down flow control valve 64 at the time n. The flow coefficient C is determined experimentally based on the orifice area A(n), operating fluid temperature and soon. δP(n) becomes the pressure $P_{in}(n)$ of the primary fluid chamber 30c at the time n during shift down. On the other hand, if we let the line pressure (calculated from the pressure sensor 74 measurement) be PL(n), δP(n) is PL(n)−$P_{in}(n)$ during shift up. The orifice area A(n) can be calculated using a characteristic model which takes into consideration dynamic characteristic between the duty ratio DS2(n) for duty control command value sent to the shift-down solenoid valve 68 and the orifice area A(n) within the shift-down flow control valve 64. For example, the dynamic characteristic of the duty ratio DS2(n) with respect to the orifice area A(n) is considered using a first-order time lag model with the time constant t0. Here, the t0 value is specified experimentally and is a function of operating fluid temperature. The characteristic of median in characteristic variation is used, for example, as a characteristic map for the duty ratio with respect to an orifice area. Note that the differential pressure detection device 128 can use the equation (2) to calculate the pressure $P_{in}(n)$ of the primary fluid chamber 30c if no pressure sensors are used.

[Equation 2]

$$P_{in}(n)=(W_{in}(n)-k_{in}\times N_{in}(n)^2)/S_{in} \quad (2)$$

where $k_{in}$ is the primary pulley centrifugal hydraulic coefficient, $N_{in}(n)$ the rotation speed of the input shaft 26 and $S_{in}$ the area of the primary moving pulley half body 30a on which pressure is exerted. $W_{in}(n)$ is the thrust of the primary moving pulley half body 30a at the time n and can be expressed by the equation (3).

[Equation 3]

$$W_{in}(n)=W_{out}(n)/(a+b\times \log_{10}\gamma(n)+c\times T_{in}(n)+d\times N_{in}(n)) \quad (3)$$

where the coefficients a, b, c and d are specified experimentally. $\gamma(n)$ is the gear ratio at the time n and can be calculated from the rotation speed $N_{in}(n)$ of the input shaft 26 and the rotation speed $N_{out}(n)$ of the output shaft 36. $T_{in}(n)$ is the torque of the input shaft 26 at the time n and can be calculated, for example, from the engine rotation speed Ne, the throttle opening amount TA, the torque ratio of the torque converter 10, input inertia torque and so on. $W_{out}(n)$ is the thrust of the secondary moving pulley half body 32a at the time n and can be expressed by the equation (4).

[Equation 4]

$$W_{out}(n)=P_{out}(n)\times S_{out}+k_{out}\times N_{out}(n)^2 \quad (4)$$

where $P_{out}(n)$ is the pressure of the secondary fluid chamber 32c (measured by the pressure sensor 74) at the time n, $k_{out}$ the secondary pulley centrifugal hydraulic coefficient, $N_{out}(n)$ the output shaft 36's rotation speed at the time n, $S_{out}$ the area of the secondary moving pulley half body 32a on which pressure is exerted.

In S108, the fluid volume estimation device 122 sums the estimated flow rate $Q_{out}(n)$ calculated in S107 to calculate the estimated change $Q_{model}(n)$ in operating fluid volume in the primary fluid chamber 30c from the shift down start time n1 to the time n and then terminates this routine. Here, the estimated change $Q_{model}(n)$ can be expressed by the equation 5).

[Equation 5]

$$Q_{model}(n)=Q_{model}(n-1)+Q_{out}(n) \quad (5)$$

If the judgment result in S101 is No, control goes to S109 where judgment is made as to whether the Flag 1 contains "1." If the judgment result in S109 is No, execution of this routine is terminated based on the conclusion that shift down is not performed. On the other hand, when the judgment result in S109 is Yes, control goes to S110 based on the conclusion that shift down is in progress.

In S110, judgment is made as to whether the predetermined amount of time t2 has elapsed since duty control command value output to the shift-down solenoid valve 68 was turned off. Here, the predetermined amount of time t2 is specified experimentally based on time delay from when output of duty control command value is turned off to when the primary moving pulley half body 30a stops moving and is a function of operating fluid temperature. If the judgment result in S110 is No, control goes to S107, based on the conclusion that shift down is not complete, where the estimated flow rate $Q_{out}(n)$ from the primary fluid chamber 30c is calculated. On the other hand, when the judgment result in S110 is Yes, control goes to S111 where the gear ratio RATIOE at the shift down end time n2 is stored based on the conclusion that shift down is complete.

In S112, the fluid volume detection device 120 calculates the amount of travel of the primary moving pulley half body 30a from the difference between the gear ratio RATIOE at the shift down end time n2 and the gear ratio RATIOS at the shift down start time n1 and calculates the detected change $Q_{real}$ in operating fluid volume during the time period from the shift down start time n1 to the shift down end time n2 based on this amount of travel. Next, control goes to S113 where the deviation δQ of this detected change $Q_{real}$ from the estimated change $Q_{model}(n2)$ during the time period from the shift down start time n1 to the shift down end time n2 or $\delta Q=Q_{real}-Q_{model}(n2)$ is calculated.

Figure 5:
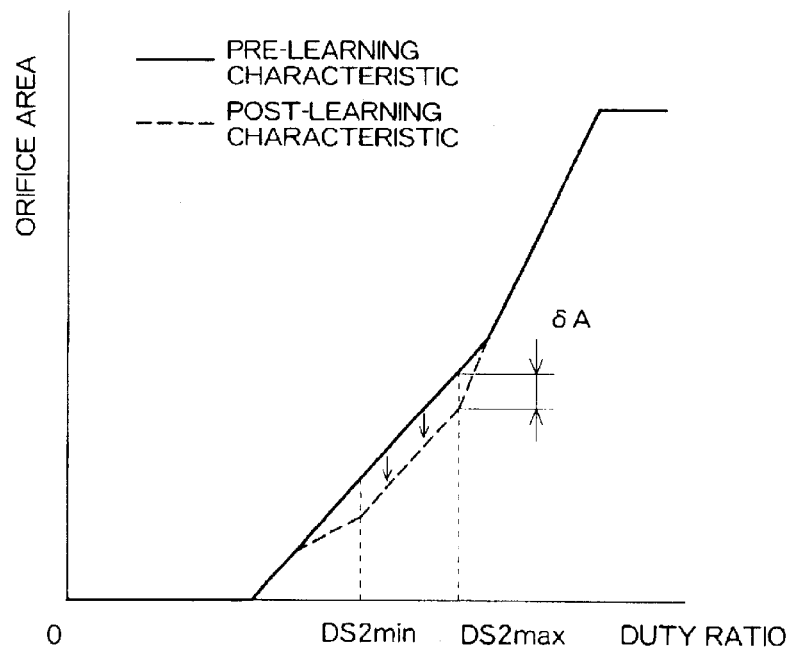
FIG. 5 illustrates description of learning and correction of characteristic map between duty ratio and orifice area in the first embodiment of the present invention.

In S114, the correction device 126 learns and corrects a characteristic map of the shift-down solenoid valve 68 and the shift-down flow control valve 64 for the duty ratio with respect to the orifice area. To be more specific, the orifice area is corrected by δA=K1×δQ for the range of duty ratios from DS2min to DS2max as shown in FIG. 5. FIG. 5 shows a case in which δQ is a negative value and in which correction is performed such that the orifice area is reduced. Here, the K1 value is specified experimentally and made larger if learning and correction are performed in a short period of time while it is made smaller if a long time is spent to ensure accuracy in learning and correction. Finally in S115, the Flag 1 is set to "0" to terminate execution of this routine. The above routine allows learning and correction of a physical model which brings duty ratio into correspondence with quantity of fluid flowing into and out of the primary fluid chamber 30c (operating fluid flow rate).

Note that learning and correction in S114 are performed repeatedly and terminated when the absolute value of δQ becomes equal to or falls below the threshold based on the conclusion that learning and correction are complete. Since difference in level may occur (especially when the K1 value is large) in the characteristic map for the duty ratio with respect to an orifice area as shown in FIG. 5 in the stage where learning and correction are in progress, learning and correction by K2×δA (0<K2<1) of orifice area may be conducted not only when the duty ratio is in the range between DS2min and DS2max but also when the duty ratio is outside this range to minimize difference in level in the characteristic map for the duty ratio with respect to orifice area.

In the present embodiment, the fluid volume estimation device 122 uses the physical model represented by the equation (1) to calculate the estimated change $Q_{model}(n2)$ in operating fluid volume within the primary fluid chamber 30c during the time period from the shift start time n1 to the shift end time n2. On the other hand, the fluid volume detection device 120 calculates the detected change $Q_{real}$ in operating fluid volume within the primary fluid chamber 30c during the time period from the shift start time n1 to the shift end time n2 based on change in gear ratio. Then the deviation δQ of this detected change $Q_{real}$ from the estimated change $Q_{model}(n2)$ is calculated, thus making it possible to accurately detect the difference between the characteristic stored in the electronic control unit 42 and the actual characteristic of the flow control unit 50—the difference caused by manufacturing variation. Additionally, since the correction device 126 corrects the characteristic map of the flow control unit 50 for the duty ratio with respect to an orifice area based on this deviation δQ, it is possible to ensure accurate learning and correction of the duty ratio to orifice area characteristic map Consequently, the ability of actual gear ratio to follow desired gear ratio can be improved. Additionally, consideration of sufficient amount of time from the shift start time n1 to the shift end time n2 in calculating the deviation δQ allows minimization of variation in learning-correction value δA and ensures stable learning and correction. Further, since the estimated change $Q_{model}(n2)$ is calculated in consideration of the dynamic characteristic between the duty ratio for duty control command value sent to the shift-down solenoid valve 68 and the orifice area within the shift-down flow control valve 64, the estimated change $Q_{model}(n2)$ can be calculated with higher accuracy, thus ensuring more accurate learning and correction. Additionally, since the characteristic map between the duty ratio and an orifice area is corrected for the range of duty ratios used for calculation of the estimated change $Q_{model}(n2)$, it is possible to ensure accurate learning and correction even if the difference in characteristic changes with change in duty ratio. Moreover, since the operating fluid pressure within the primary fluid chamber 30c is determined using the physical models represented by the equations (2) through (4), it is possible to do without the pressure sensor for detecting the operating fluid pressure within the primary fluid chamber 30c, thus reducing costs.

In the present embodiment, the case is described in which learning and correction of duty ratio to orifice area characteristic are conducted from detected and estimated changes in operating fluid volume during the time period from shift start time to shift end time. However, learning and correction of the duty ratio to orifice area characteristic may be conducted from detected and estimated changes in operating fluid volume over a predetermined period of time during gear change operation. Note that learning and correction employed in this embodiment are effective not only in the case of difference in characteristic caused by manufacturing variation of the flow control unit 50 but also in the case of difference in characteristic caused by change in the flow control unit 50 over time.

(2) Second Embodiment

Figure 6:
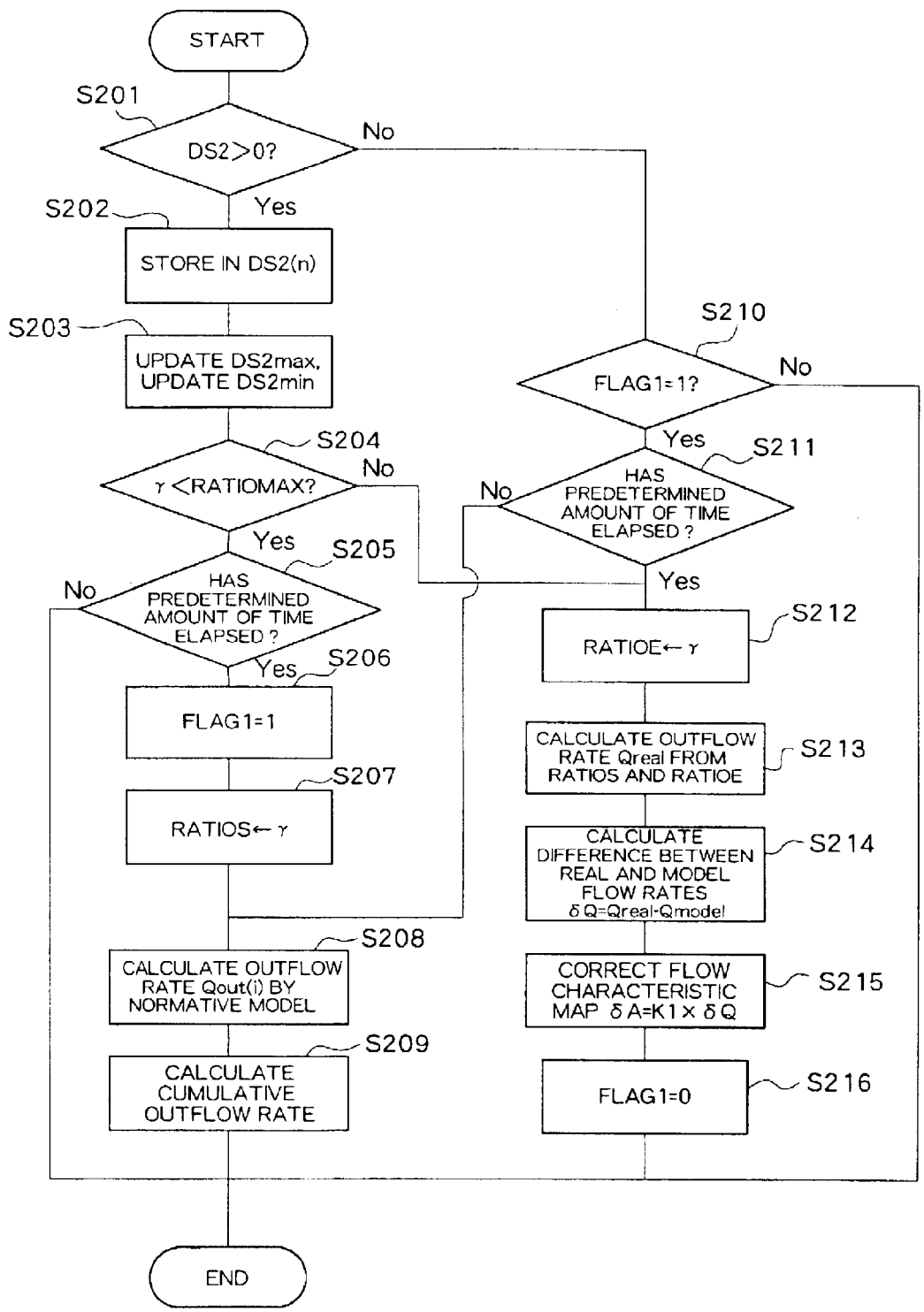
FIG. 6 is a flowchart showing the flow characteristic correction routine used in the second embodiment of the present invention.

FIG. 6 is a flowchart showing a flow characteristic correction routine associated with the second embodiment of the present invention and shows a case in which shift down is performed as with the first embodiment. Note, however, that shift up can also be achieved by a similar routine.

In S204 in FIG. 6, the fluid volume estimation device 122 judges whether the gear ratio γ(n) at the current sample time n is smaller than the setting RATIOMAX. When the judgment result in S204 is Yes, control goes to S205. On the other hand, if the judgment result in S204 is No, control goes to S212. Here, the minimum value of the maximum gear ratio or a value close to and smaller than that minimum value is used as the RATIOMAX value in consideration of variation in maximum gear ratio of the continuously variable transmission 14. In the case of shift up, on the other hand, judgment is made as to whether the gear ratio γ(n) is larger than the setting RATIOMIN. Here, the maximum value of the minimum gear ratio or a value close to and larger than that maximum value is used as the RATIOMIN value in consideration of variation in minimum gear ratio of the continuously variable transmission 14. Description of remaining configuration is omitted as it is similar to that of the first embodiment.

In the present embodiment, if the gear ratio falls outside the range between RATIOMIN and RATIOMAX, calculation of the estimated change in operating fluid volume within the primary fluid chamber 30c is stopped at that point in time, and learning and correction of duty ratio to orifice area characteristic are conducted based on the deviation δQ of the detected change $Q_{real}$ from the estimated change $Q_{model}(n2)$ up to that point. Here, since the maximum and minimum gear ratios of the continuously variable transmission 14 have variation, the gear ratio may remain unchanged due to its saturation at the maximum gear ratio, for example, in the case of shift down despite output of duty control command value to the shift-down solenoid valve 68. In this case, although assumption is made that the estimated change in operating fluid volume within the primary fluid chamber 30c, which is calculated based on duty ratio, varies, the detected change in operating fluid volume within the primary fluid chamber 30c, which is calculated based on change in gear ratio, remains unchanged. This causes an error in estimation of change in operating fluid volume within the primary fluid chamber 30c, thus resulting in erroneous learning and correction of characteristic map between the duty ratio and an orifice area. This is also true for shift up. In this embodiment, however, when gear ratio reaches a value near the maximum gear ratio (in the case of shift down) or a value near the minimum gear ratio (in the case of shift up), estimation of change in operating fluid volume within the primary fluid chamber 30c is stopped, thus preventing erroneous learning during learning and correction of characteristic of the flow control unit 50 between the duty ratio and an orifice area and ensuring more accurate learning and correction.

Additionally, the RAIOMAX and RATIOMIN values may be specified through learning in this embodiment. To be more specific, when the maximum gear ratio is used as target gear ratio in the case of shift down, the gear ratio value available when the predetermined amount of time t3 elapses is specified as the RATIOMAX value. Here, the t3 value is specified experimentally based on the dynamic characteristics of the flow control unit 50 and the primary moving pulley half body 30a and is a function of operating fluid temperature and gear ratio. Additionally, a gear ratio may be used as the RATIOMAX value if this gear ratio remains unchanged even when a duty control command value is output to the shift-down solenoid valve 68 for the predetermined amount of time t4 and provided that the duty ratio for that duty control command value brings about flow from the shift-down flow control valve 64. Here, the t4 value is also specified experimentally based on the dynamic characteristics of the flow control unit 50 and the primary moving pulley half body 30a and is a function of operating fluid temperature.

(3) Third Embodiment

Figure 7:
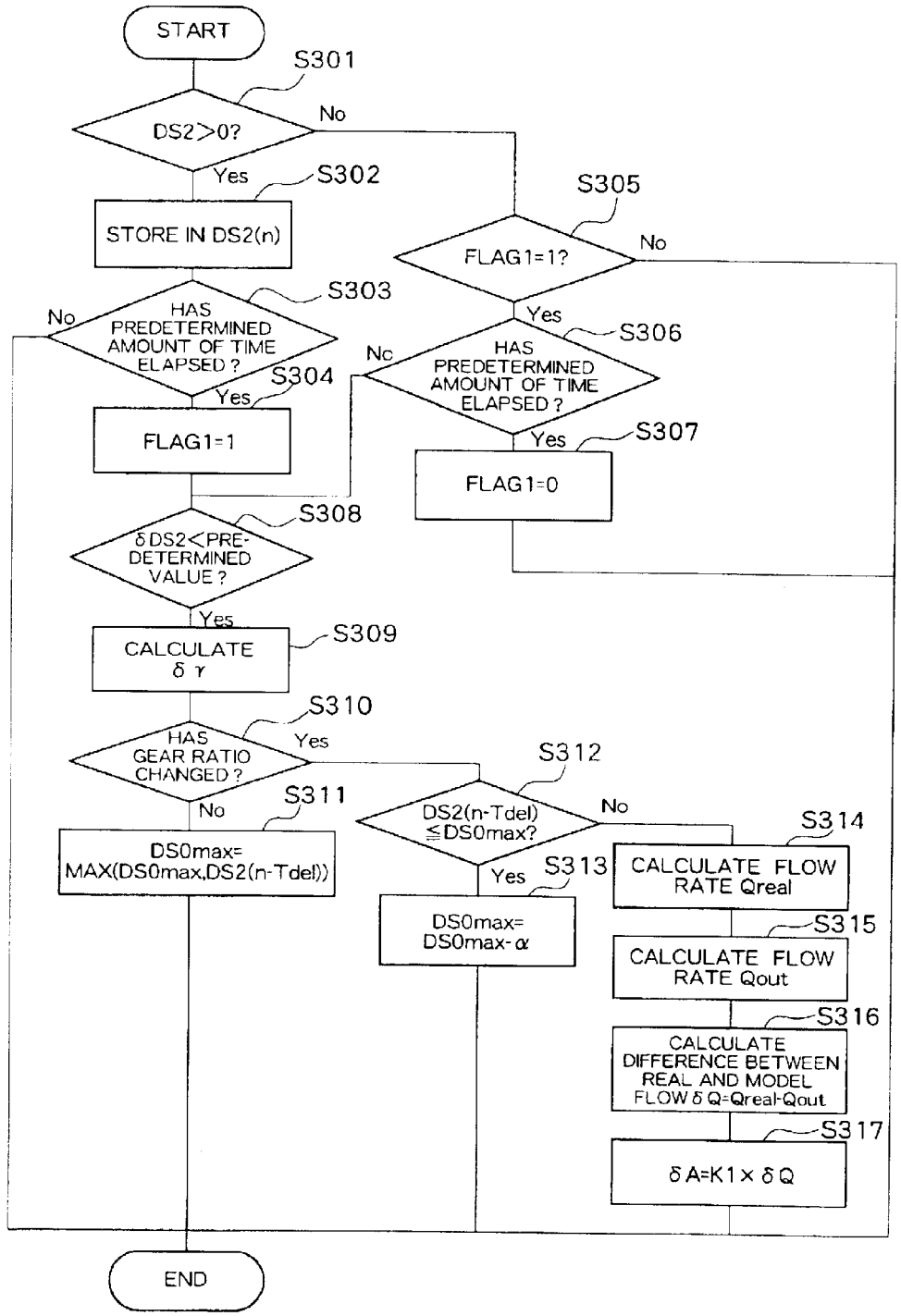
FIG. 7 is a flowchart showing the flow characteristic correction routine used in the third embodiment of the present invention.

FIG. 7 illustrates a flowchart showing a flow characteristic correction routine associated with the third embodiment of the present invention and shows a case in which shift down is performed as with the first embodiment. Note, however, that shift up can also be achieved by a similar routine. Execution of this flow characteristic correction routine is repeated at intervals of a predetermined amount of time. Note that the electronic control unit 42 comprises a fluid flow detection device which calculates the flow rate of operating fluid entering and leaving the primary fluid chamber 30c and a fluid flow estimation device which estimates the flow rate of operating fluid entering and leaving the primary fluid chamber 30c although these devices are not illustrated. Description of the overall configuration including the hydraulic control unit 40 is omitted as it is similar to that of the first embodiment.

First in S301, judgment is made as to whether duty control command value is output to the shift-down solenoid valve 68. If the judgment result in S301 is No, control goes to S305 which will be discussed later. On the other hand, when the judgment result in S301 is Yes, control goes to S302 where the duty ratio for duty control command value at the current sample time n is stored in the memory DS2(n).

In S303, judgment is made as to whether the predetermined amount of time t1 has elapsed since duty control command value began to be output to the shift-down solenoid valve 68. Here, the predetermined amount of time t1 is specified experimentally based on time delay from when output of duty control command value begins to when the primary moving pulley half body 30a begins to move and is a function of operating fluid temperature. If the judgment result in S303 is No, execution of this routine is terminated based on the conclusion that shift down has not been initiated. On the other hand, when the judgment result in S303 is Yes, control goes to S304 where the Flag 1 is set to "1" based on the conclusion that shift down has been initiated and then control goes to S308 which will be discussed later.

If the judgment result in S301 is No, control goes to S305 where judgment is made as to whether the Flag 1 contains "1." If the judgment result in S305 is No, execution of this routine is terminated based on the conclusion that shift down is not performed. On the other hand, when the judgment result in S305 is Yes, control goes to S306 based on the conclusion that shift down is in progress.

In S306, judgment is made as to whether the predetermined amount of time t2 has elapsed since duty control command value output to the shift-down solenoid valve 68 was turned off. Here, the predetermined amount of time t2 is specified experimentally based on time delay from when output of duty control command value is turned off to when the primary moving pulley half body 30a stops moving and is a function of operating fluid temperature. If the judgment result in S306 is No, control goes to S308 which will be discussed later. On the other hand, when the judgment result in S306 is Yes, control goes to S307 where the Flag 1 is set to "0" and execution of this routine terminated based on the conclusion that shift down is complete.

Figure 8:
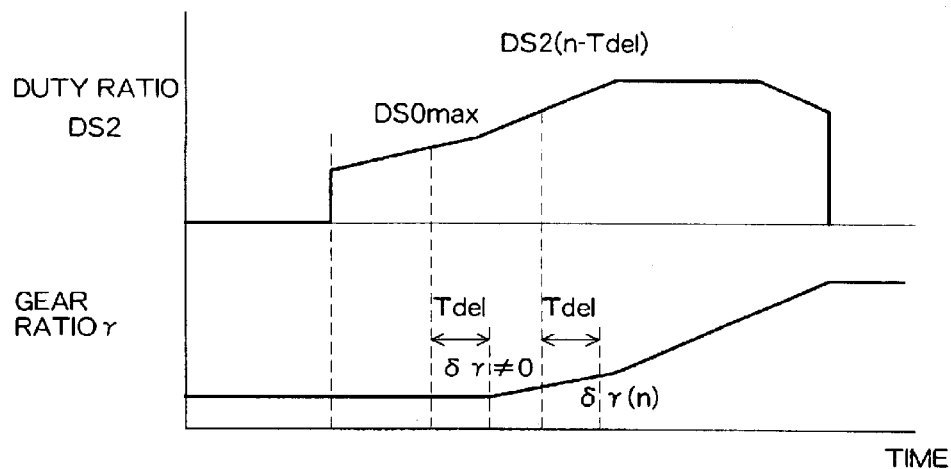
FIG. 8 is a timing chart showing changes in duty ratio and gear ratio over time during shift down.

In S308, judgment is made as to whether the change in duty ratio $\delta DS2(2-T_{del})$ per unit time at $T_{del}$ prior to the time n as shown in the timing chart of FIG. 8 is smaller than the predetermined value x. Here, the predetermined time $T_{del}$ is specified experimentally based on dynamic characteristic for the duty ratio DS2(n) for duty control command value sent to the shift-down solenoid valve 68 with respect to the orifice area A(n) within the shift-down flow control valve 64 and also based on dynamic characteristic of the primary moving pulley half body 30a and is a function of gear ratio and operating fluid temperature. If the judgment result in S308 is No, this routine is terminated without performing learning and correction based on the conclusion that a larger error will be introduced into learning and correction of the duty ratio to orifice area characteristic map, which will be discussed later.

On the other hand, when the judgment result in S308 is Yes, control goes to S309 where the fluid flow detection device calculates the change in gear ratio $\delta\gamma(n)$ at the time n per unit time. Next, control goes to S310 where judgment is made as to whether the gear ratio has changed from the change in gear ratio $\delta\gamma(n)$. If the judgment result in S310 is No, control goes to S311 where the correction device 126 updates, based on the conclusion that no flow has occurred from shift-down flow control valve 64, the value stored as the duty ratio DS0max at which flow begins to take place, thus allowing learning and correction of the duty ratio to orifice area characteristic map. To be more specific, if the duty ratio $DS2(n-T_{del})$ is larger than the current DS0max, the DS0max value is updated to the $DS2(n-T_{del})$ value. Here, since the duty ratio-gear ratio characteristic presents a time delay between two ratios as shown in the timing chart of FIG. 8, the duty ratio available the predetermined time $T_{del}$ earlier is used for updating. In this case, the learning-correction value α is equal to the difference between DS2$(n-T_{del})$ and pre-updating DS0max. On the other hand, when the judgment result in S310 is Yes, control goes to S312 based on the conclusion that flow occurs from the shift-down flow control valve 64.

Figure 9:
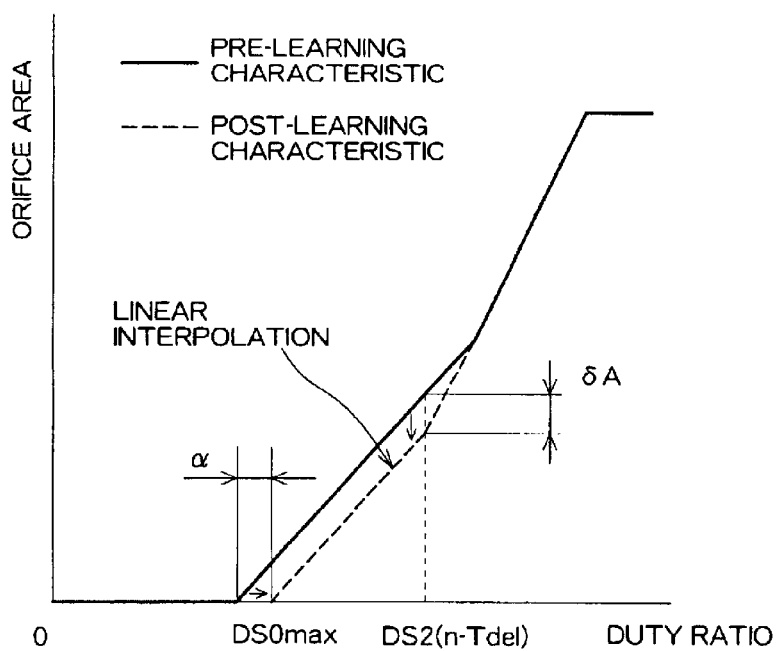
FIG. 9 illustrates description of learning and correction of characteristic map between duty ratio and orifice area in the third embodiment of the present invention.

In S312, judgment is made as to whether the duty ratio $DS2(n-T_{del})$ is equal to or smaller than the DS0max value. Here, the duty ratio available the predetermined time $T_{del}$ earlier is also used as the value to be compared. When the judgment result in S312 is Yes, control goes to S313 where the correction device 126 updates the value stored as DS0max to (DS0max-α) to perform learning and correction of characteristic map between the duty ratio and an orifice area because the duty ratio at which flow begins to occur from the shift-down flow control valve 64 is smaller than the DS0max value. Here, the learning-correction value α in FIG. 9 is specified experimentally and made larger if learning and correction are performed in a short period of time while it is made smaller if a long time is spent to ensure accuracy in learning and correction.

On the other hand, if the judgment result in S312 is No, control goes to S314 where the fluid flow detection device calculates the travel speed of the primary moving pulley half body 30a from the change in gear ratio $\delta\gamma(n)$ at the time n and then calculates the detected flow rate $Q_{real}(n)$ from the primary fluid chamber 30c at the time n based on this travel speed. Next, control goes to S315 where the fluid flow estimation device uses physical models similar to those used in the first embodiment to calculate the estimated flow rate $Q_{out}(n)$ from the primary fluid chamber 30c at the time n. Then in S316, the deviation $\delta Q(n)$ of the detected flow rate $Q_{real}(n)$ from the estimated flow rate $Q_{out}(n)$ or $Q_{real}(n)-Q_{out}(n)$ is calculated.

Finally in S317, the correction device 126 performs learning and correction of the characteristic map of the shift-down solenoid valve 68 and the shift-down flow control valve 64 for the duty ratio with respect to the orifice area before this routine is terminated. To be more specific, the orifice area, available when the duty ratio is $DS2(n-T_{del})$, is corrected by $\delta A=K1\times\delta Q$ as shown in FIG. 9. Here, since the duty ratio to orifice area characteristic presents a time delay between two ratios as shown in the timing chart of FIG. 8, the duty ratio available the predetermined time $T_{del}$ earlier is also used for correction. FIG. 9 shows a case in which the $\delta Q$ value is negative and in which correction is made such that the orifice area is reduced. Here, the K1 value is specified experimentally and made larger if learning and correction are performed in a short period of time while it is made smaller if a long time is spent to ensure accuracy in learning and correction. The above routine allows learning and correction of a physical model which brings duty ratio into correspondence with quantity of fluid flowing into and out of the primary fluid chamber 30c (operating fluid flow rate).

Note that learning and correction in S317 are performed repeatedly and terminated when the absolute value of δQ becomes equal to or falls below the threshold based on the conclusion that learning and correction are complete. Also, since difference in level may occur (especially when the K1 value is large) in a duty ratio to orifice area characteristic map as shown in FIG. 9 in the stage where learning and correction are in progress, learning and correction by K2×δA (0<K2<1) of orifice area may be conducted not only when the duty ratio is DS2($n-T_{del}$) but also when the duty ratio is not DS2($n-T_{del}$) to minimize difference in level in a duty ratio to orifice area characteristic map. Additionally, as for orifice area available when the duty ratio is not subjected to learning and correction, the range of orifice areas between two duty ratios which have been subjected to learning and correction may be corrected, for example, through linear interpolation as shown in FIG. 9.

As with the first embodiment, this embodiment allows accurate detection of the difference between the characteristic stored in the electronic control unit 42 and the actual characteristic of the flow control unit 50—the difference caused by manufacturing variation—and ensures accurate learning and correction of the duty ratio to orifice area characteristic map. Consequently, the ability of actual gear ratio to follow desired gear ratio can be improved. Further, since the duty ratio to orifice area characteristic map is corrected for the duty ratios used for calculation of the estimated flow rate $Q_{out}(n)$, it is possible to ensure accurate learning and correction even if the difference in characteristic changes with change in duty ratio.

Further, since this embodiment corrects the duty ratio DS0max, at which flow begins to occur, by finding the change in gear ratio with respect to duty ratio, it is possible to accurately learn and correct the DS0max value. Consequently, the flow control unit 50 can accurately control gear ratio when gear ratio is changed only slightly, thus minimizing gear ratio hunting in which shift up and shift down are repeated to maintain gear ratio at a desired level. Further, since the DS0max value is corrected in consideration of the dynamic characteristic between the duty ratio for duty control command value sent to the shift-down solenoid valve 68 and the orifice area within the shift-down flow control valve 64, it is possible to accurately learn and correct the DS0max value, thus further minimizing gear ratio hunting.

Note that the mean value of a plurality of sample times may be used to calculate the detected flow rate $Q_{real}(n)$ and the estimated flow rate $Q_{model}(n)$ in this embodiment.

(4) Fourth Embodiment

Shift control of the continuously variable transmission 14 in the fourth embodiment is conducted through feedback or feedforward control of the manipulated variable (solenoid valve control value) sent to the shift-up solenoid valve 66 or the shift-down solenoid valve 68 in accordance with the input shaft 26's target rotation speed or target shift speed. When solenoid valve control value (duty ratio) is calculated in feedback or feedforward control, a physical model which relates solenoid valve control value with quantity of fluid flowing into and out of pulley (operating fluid flow rate) is referenced. Further, this physical model is compared with the measured value obtained as a result of actual gear change control for learning and correction. Here, learning and correction of the physical model can be conducted by repeatedly executing the flow characteristic correction routine of one of the first to the third embodiments.

The hydraulic control signal calculation device 124 in this embodiment has a feedforward control device which calculates a feedforward manipulated variable to be sent to the flow control unit 50 based on duty ratio to orifice area characteristic map, a feedback control device which calculates a feedback manipulated variable to be sent to the flow control unit 50 and a weight setting device which specifies weights for feedforward and feedback manipulated variables. This embodiment uses feedback and feedforward control as gear change operation control and further utilizes the physical model mentioned earlier to calculate the manipulated variable (solenoid valve control value). For this reason, the solenoid valve control value (duty ratio) Duty is defined as follows:

$$\text{Duty} = \alpha \times FB\text{Duty} + \beta \times FF\text{Duty}$$

where FBDuty is the feedback control value, FFDuty is the feedforward control value and α and β are the weight coefficients. Note that description of the remaining configuration is omitted as it is similar to that of the first embodiment.

Figure 10:
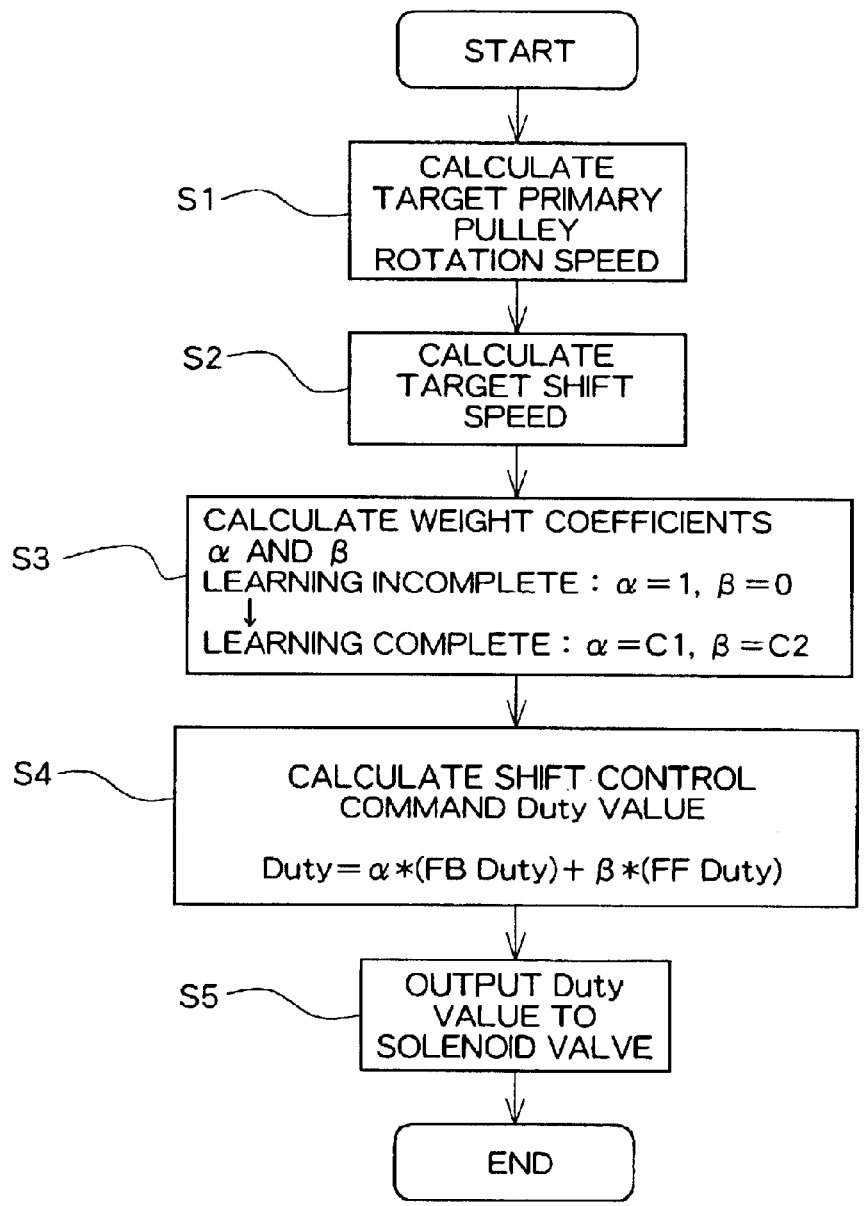
FIG. 10 is a flowchart showing the control flow used in the fourth embodiment of the present invention.

FIG. 10 illustrates a flowchart used in the present embodiment when the solenoid valve control value Duty is output. Description of each of the steps in FIG. 10 is as follows:

Step 1: The target input shaft rotation speed Nint is calculated. Nint is calculated, for example, from a map between a vehicle speed and an accelerator opening amount or as the optimal fuel economy rotation speed in the case of cooperative control with the engine. FBDuty is calculated based on the deviation of the actual input shaft rotation speed Nin from the calculated Nint (Nint−Nin).

Step 2: Target shift speed is calculated. FFDuty is calculated from the above-mentioned physical model based on target shift speed.

Step 3: The weight coefficients α and β are specified. Since FFDuty is calculated based on the physical model, reflection of FFDty in the solenoid valve control value Duty before learning and correction of the physical model can cause variation in the control value, thus resulting in aggravation of the shift characteristic. For this reason, α=1 and β=0 are used in the early stage of the physical model learning. That is, use of only feedback control in the early stage of learning can help to minimize variation in change gear control prior to completion of learning and correction.

Step 4: The solenoid valve control value Duty is calculated based on α, β, FBDuty and FFDuty which have been specified.

Step 5: The solenoid valve control value Duty is output to the solenoid valve for gear change operation.

The above steps 1 through 5 are repeated each time gear change control is performed, and learning and correction of the physical model are conducted during every gear change operation, as a result of which learning and correction of the physical model progress as gear change operation is repeated. With this embodiment, the weight coefficients α and β may be changed in Step 3 in accordance with the progress of learning and correction. That is, one starts with α=1 and β=0 in the early stage of learning and then uses δQ, for example, as an index to change the α-β ratio gradually such that β increases in accordance with the progress of learning and correction. This ensures control operation in accordance with the progress of learning and correction and allows reflection of what has been learned even during learning and correction.

Figure 11:
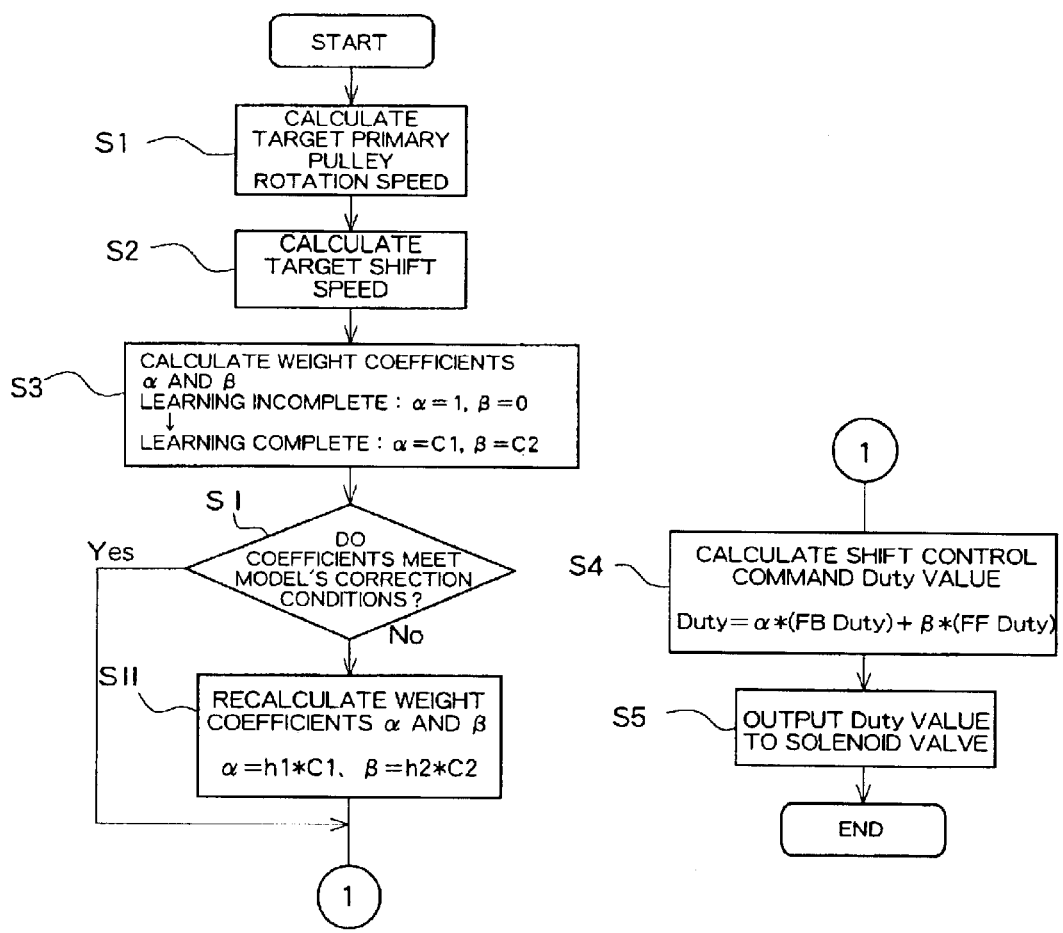
FIG. 11 is a flowchart showing a modified example of the control flow used in the fourth embodiment of the present invention.

Note that although feedforward control is performed by referencing a physical model in this embodiment, it is possible to employ the embodiment under those operating conditions to which it is difficult to apply a physical model as under extremely low fluid temperature or abrupt acceleration or deceleration. In this case, weight coefficient may be specified again by using fluid temperature or acceleration or deceleration as a parameter. For example, steps I and II are added between steps 3 and 4 in FIG. 10 as shown in FIG. 11.

In step I, judgment is made as to whether the condition for applying a physical model is met, for example, whether the fluid temperature is equal to or below the predetermined temperature. When the condition is met, control goes to step 4, which is the same as the flow in FIG. 10. If the condition is not met, control goes to step II. In step II, the weight coefficients α and β specified in step 3 are further multiplied respectively by h1 and h2. For example, h1=1 and h2=0 may always be used when the fluid temperature is equal to or below the predetermined temperature, or h2 may be increased as the fluid temperature increases and approaches the predetermined temperature. This helps to minimize aggravation of shift characteristic even under those operating conditions to which physical model cannot be readily applied.

(5) Fifth Embodiment

Figure 12:
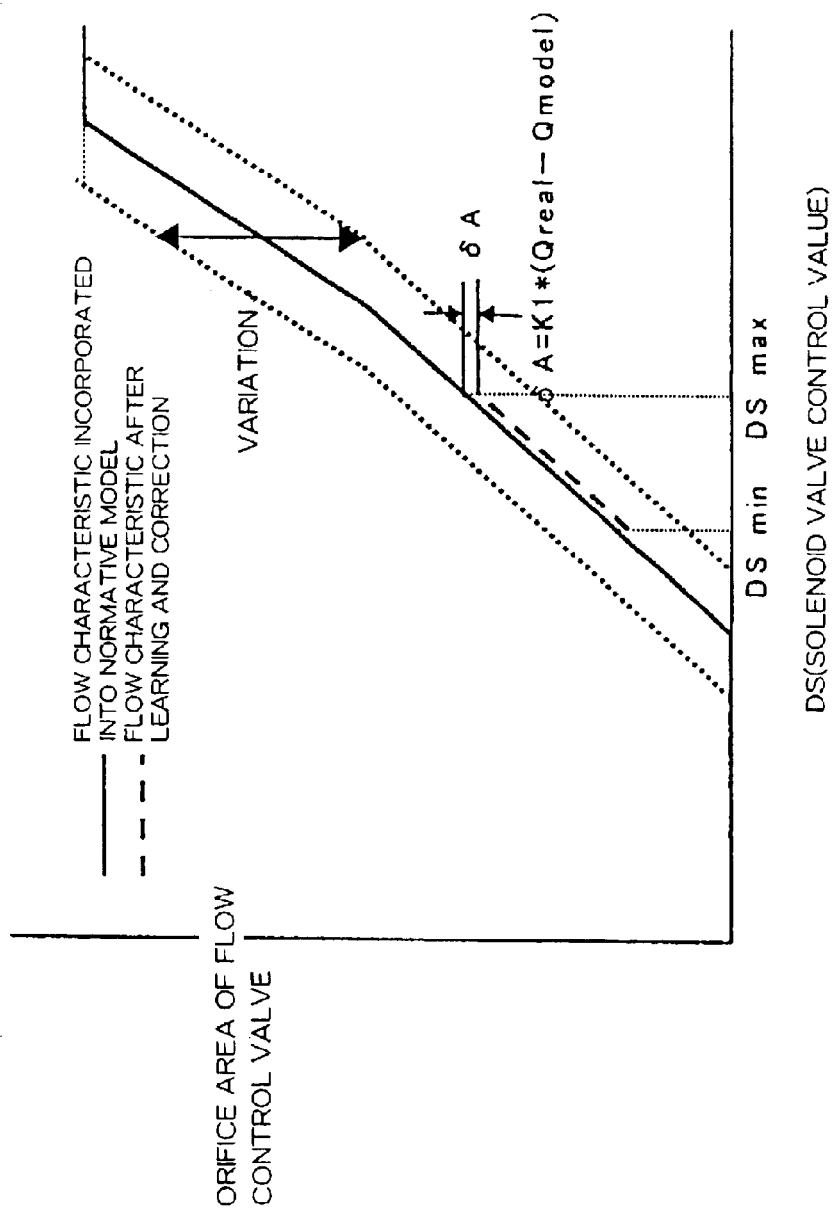
FIG. 12 illustrates a flow control valve characteristic.
Figure 13:
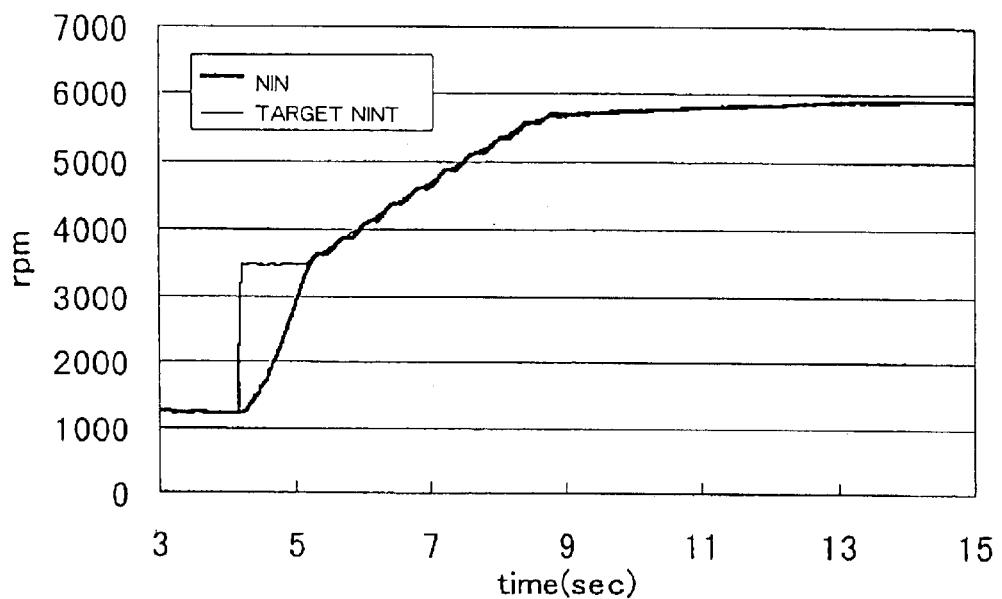
FIG. 13 illustrates gear change control hunting.
Figure 14:
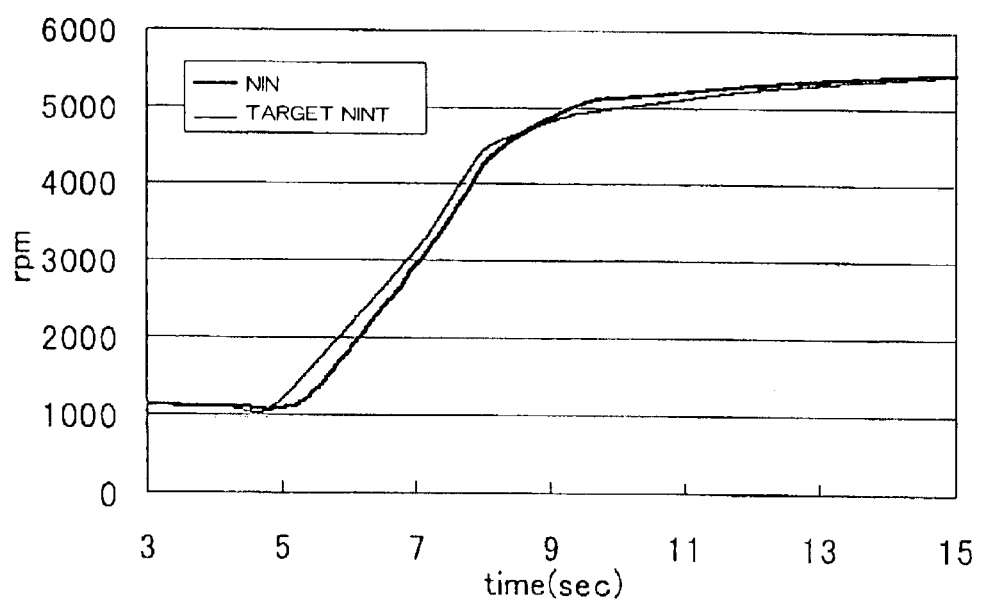
FIG. 14 illustrates gear change control follow-up ability delay.

The hydraulic control signal calculation device 124 in the fifth embodiment has a feedback control device which uses a physical model to calculate the feedback manipulated variable to be sent to the flow control unit 50. This embodiment uses feedback control as gear change operation control and further utilizes the above physical model to calculate the manipulated variable (solenoid valve control value). Learning and correction of the physical model are conducted during every gear change operation, as a result of which learning and correction of the physical model progress as gear change operation is repeated. At this time, feedback gain of the feedback control is changed in accordance with the progress of learning and correction of the physical model. That is, feedback gain can be made larger with the progress of learning and correction. The reason for this is as follows:

In the variation of the flow control valve shown in FIG. 12, if the flow control valve orifice area varies on the larger side, that is, if the actual flow rate is greater than the flow rate according to the physical model, hunting (swinging of actual rotation speed) will occur as shown in FIG. 13 since the actual flow rate is large relative to the predetermined solenoid valve control value (duty ratio). For this reason, feedback gain must be reduced to minimize hunting. Additionally, if feedback gain is made small to minimize hunting, there is a delay in actual gear ratio following desired gear ratio as shown in FIG. 14, thus making it difficult to improve the follow-up ability.

Due to the reasons mentioned above, it is possible to improve follow-up ability while minimizing hunting by changing feedback gain in accordance with the progress of learning and correction of physical model, that is, by increasing feedback gain as learning and correction progress.

Figure 15:
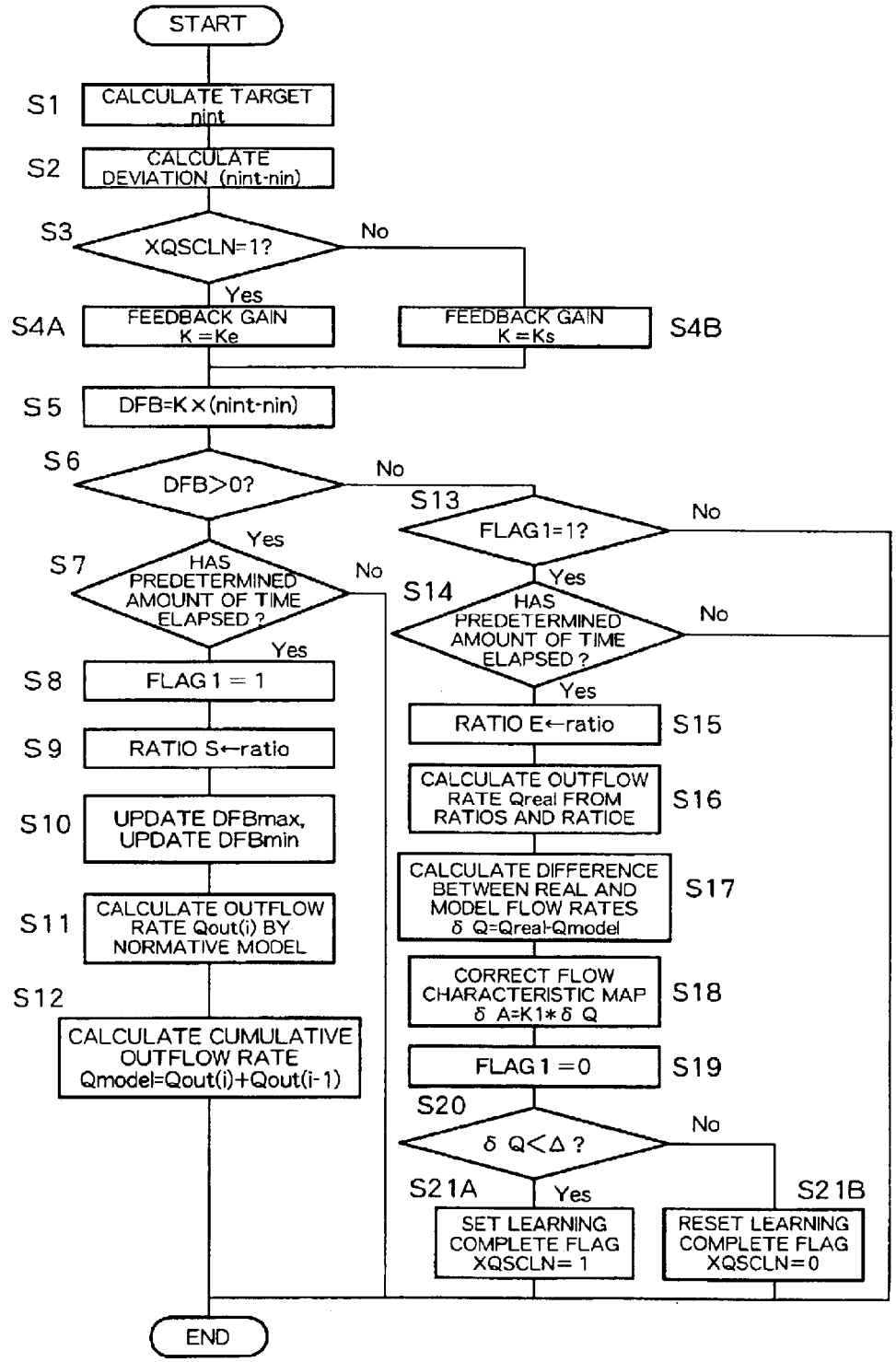
FIG. 15 is a flowchart showing the control flow used in the fifth embodiment of the present invention.

FIG. 15 illustrates the control flow used to change feedback gain in this embodiment. A case, in which gear ratio (=input shaft rotation speed/output shaft rotation speed) is changed from RATIOS to RATIOE through shift down gear control, is described as an example of feedback gain change method by referring to FIG. 15. It is possible to apply a similar method to shift up gear control although description of such a method is omitted. Note also that description of the remaining configuration is omitted as it is similar to that of the fourth embodiment.

Step 1: The target input shaft rotation speed Nint is calculated. Nint is calculated, for example, from a map for a vehicle speed with respect to accelerator opening amount or as the optimal fuel economy rotation speed in the case of cooperative control with the engine.

Step 2: The deviation of the actual input shaft rotation speed Nin from the calculated Nint (Nint−Nin) is calculated.

Step 3: Judgment is made as to whether learning of a physical model is complete. The flag XQSCLN is used as an index to make this judgment, and learning is assumed to be complete (Yes) and incomplete (No) respectively when the flag contains "1" and "0."

Step 4: When learning is assumed to be complete in step 3, the feedback gain K=Ke (step 4A) while if learning is assumed to be incomplete, the feedback gain K=Ks (step 4B). As discussed later, the feedback gain may be changed gradually in accordance with the progress of learning.

Step 5: The solenoid valve control value (duty ratio) DFB=K×(Nint−Nin) is calculated. Here, K represents feedback gain.

Step 6: Judgment is made as to whether the solenoid valve control value DFB for shift down gear control is output. Here, when DFB >0, shift down gear control is performed (Yes) while if DFB=0, shift down gear control is not performed (No).

Step 7: It is necessary to wait for the time t1 (refer to FIG. 4)—the period of time from start of control command to start of shift—to elapse.

Step 8: The Flag 1, which indicates that shift down gear control is performed, is set to "1."

Step 9: The gear ratio at the start of shift down is stored in memory as RATIOS.

Step 10: The solenoid valve control value DFB calculated in step 5 is compared with the DFB's maximum value DFBmax and the DFB's minimum value DFBmin which are stored in memory, and DFBmax and DFBmin are updated respectively if DFB is larger than the maximum value or if it is smaller than the minimum value.

Step 11: A physical model is used to calculate the flow rate $Q_{out}$ from the primary pulley from the solenoid valve control value. The model shown earlier in the equation (1) is used as the physical model.

Step 12: The sum $Q_{model}$ of the above flow rate $Q_{out}$ is calculated.

The above steps are repeated until shift down gear control ends (DFB=0). When DFB=0 at the end of shift down gear control, control branches from step 6 to step 13.

Step 13: Judgment is made as to whether the Flag 1 contains "1." When the Flag 1 contains "1", control branches to step 14.

Step 14: It is necessary to wait for the time t2 (refer to FIG. 4)—the period of time from end of shift down gear control (DFB=0) to end of shift—to elapse.

Step 15: The gear ratio at the end of shift down is stored in memory as RATIOE.

Step 16: The amount of travel of the pulley is calculated from the gear ratio RATIOS at the start of control and the gear ratio RATIOE at the end of control stored in memory respectively in steps 9 and 15, and then the actual flow rate $Q_{real}$ from the primary pulley is calculated from this amount of travel.

Step 17: The difference δQ between $Q_{model}$ calculated from the physical model and $Q_{real}$ calculated from the actual gear ratios or $\delta Q = Q_{real} - Q_{model}$ is determined. This difference is primarily caused by flow control valve variation.

Step 18: The flow characteristic map (FIG. 12) is corrected. The characteristic map is corrected, for example, only by δA=K1×δQ (K1: correction coefficient) for the range of solenoid valve control values (DFBmax to DFBmin)—the range stored in step 11 during which down gear change operation is performed. FIG. 12 shows a case in which $\delta Q<0$. That is, this figure shows a case in which the physical model is corrected such that the flow rate decreases since the actual flow rate is smaller than that calculated by the model. In the above description, correction of the physical model was shown when the control value was within the actual control range (DFBmax to DFBmin); however, correction may be made, for example, only by $\delta A=K2 \times K1 \times \delta Q$ (K2: out-of-range correction coefficient) when the control value falls outside the DFBmax–DFBmin range.

Step 19: The Flag 1 is set to "0."

Step 20: Judgment is made as to whether $\delta Q<\Delta$ ($\Delta$: learning end constant). Learning and correction progress as the above correction is made through shift down or shift up a plurality of times, and $\delta Q$ approaches 0 as learning is conducted to a sufficient degree. Note, however, that in reality learning is assumed to be complete when $\delta Q<\Delta$ ($\Delta$: learning end constant) in consideration of the accuracy of the model. As for $\Delta$, for example, model error is statistically determined in advance and then a value that is several percent (e.g., ten percent) of the determined error is used as $\Delta$. Note that if $\delta Q$ is equal to or greater than $\Delta$, the correction coefficient (K1 or K2) in step 18 may be changed in accordance with the magnitude of $\delta Q$.

Step 21: When learning is assumed to be complete in step 20, the learning complete flag XQSCLN is set to "1" (step 21A) while the learning complete flag XQSCLN is set to "0" (step 21B) if learning is assumed to be incomplete in step 20.

As described above, K is made small (K=Ks) in the early stage of physical model learning while K is made large or K=Ke (Ks<Ke) when learning for the physical model is complete. That is, if the physical model exhibits variation, the fluid flow rate for the predetermined solenoid valve control value also varies, as a result of which shift hunting and other problems can readily occur. Therefore, feedback gain is made small and when physical model learning and correction are complete, feedback gain is made large to minimize variation in fluid flow rate for the predetermined solenoid valve control value, thus providing improved follow-up ability.

Note also that with this embodiment the feedback gain K may be changed in step 4 in accordance with the progress of physical model learning and correction. That is, initially K=Ks in the early stage of learning and then $\delta Q$ is used, for example, as an index to increase K such that K gradually approaches Ke in accordance with the progress of learning and correction, thus ensuring control operation in accordance with the progress of learning and correction and allowing reflection of what has been learned even during learning and correction.

Note that although gear change control is performed by referencing a physical model in this embodiment, it is possible to employ the embodiment under those operating conditions to which it is difficult to apply a physical model as under extremely low fluid temperature or abrupt acceleration or deceleration. In this case, feedback gain may be specified again by using fluid temperature, acceleration or deceleration as a parameter. For example, if the fluid temperature is extremely low, feedback gain is maintained low even when learning of the physical model is complete. This helps to minimize aggravation of shift characteristic even under those operating conditions to which physical model cannot be readily applied.

Although a belt type continuously variable transmission was discussed in the above embodiments, the present invention can be applied to a toroidal type continuously variable transmission in which gear ratio is continuously changed by changing the inclination angle of a power roller held between an input disc on the engine side and an output disc on the wheel side. Note that the flow characteristic correction routines in the first to third embodiments may be combined to perform learning and correction. Additionally, although the flow characteristic correction routines in the first to third embodiments were described only in the case of shift down, the present invention can also be applied to shift up. Moreover, although the case in which a duty ratio to orifice area characteristic is stored in the electronic control unit to perform learning and correction in each of the embodiments, the characteristic stored in the electronic control unit is not limited to duty ratio to orifice area characteristic and a duty ratio to (flow coefficient×orifice area) characteristic between may be stored, for example, to perform learning and correction.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A control apparatus for a continuously variable transmission which controls the gear ratio by using an operating fluid supply and discharge device to change the flow rate of operating fluid entering and leaving a gear change mechanism, the control apparatus comprising:

a hydraulic control signal calculation device which calculates a hydraulic control signal output to the operating fluid supply and discharge device;

a fluid volume detection device which detects a change in operating fluid volume within the gear change mechanism over a predetermined period of time during which gear change operation is in progress;

a fluid volume estimation device which estimates a change in operating fluid volume within the gear change mechanism over the predetermined period of time, based on the hydraulic control signal; and a correction device which corrects a hydraulic control signal to flow control output characteristic map for the operating fluid supply and discharge device, based on the deviation of the value detected by the fluid volume detection device from the value estimated by the fluid volume estimation device.

2. The control apparatus for a continuously variable transmission according to claim 1, wherein the fluid volume estimation device includes a differential pressure detection device which detects the difference between operating fluid pressures anterior and posterior to the operating fluid supply and discharge device, the fluid volume estimation device estimating a change in operating fluid volume within the gear change mechanism, based on the hydraulic control signal and on the value detected by the differential pressure detection device.

3. The control apparatus for a continuously variable transmission according to claim 2, wherein the fluid volume estimation device estimates a change in operating fluid volume within the gear change mechanism, based on the hydraulic control signal, on the value detected by the differential pressure detection device and on a dynamic characteristic model for the hydraulic control signal with respect to the flow control output.

4. The control apparatus for a continuously variable transmission according to claim 2, wherein the gear change mechanism comprises a primary pulley to which driving torque is transferred from a prime mover, a secondary pulley which transfers driving torque to a load and a belt which is passed around the primary pulley and the secondary pulley, wherein the operating fluid supply and discharge device controls the gear ratio by changing the flow rate of operating fluid entering and leaving the primary pulley, wherein the control apparatus further includes a primary rotation speed detection device which detects the primary pulley rotation speed, a secondary rotation speed detection device which detects the secondary pulley rotation speed, an input torque detection device which detects input torque transferred to the primary pulley and a secondary pressure detection device which detects operating fluid pressure within the secondary pulley, and wherein the differential pressure detection device detects the difference between operating fluid pressures anterior and posterior to the operating fluid supply and discharge device, based on the values detected by the primary rotation speed detection device, the secondary rotation speed detection device, the input torque detection device and the secondary pressure detection device.

5. The control apparatus for a continuously variable transmission according to claim 1, wherein the correction device corrects the hydraulic control signal to flow control output characteristic map for the range of hydraulic control signal values used for estimation of a change in operating fluid volume by the fluid volume estimation device.

6. The control apparatus for a continuously variable transmission according to claim 1, further comprising a gear ratio detection device which detects the gear ratio of the continuously variable transmission, wherein the fluid volume detection device detects a change in operating fluid volume within the gear change mechanism, based on the amount of change in the gear ratio over the predetermined period of time.

7. The control apparatus for a continuously variable transmission according to claim 1, wherein the predetermined period of time is from the start of gear change operation to the end of gear change operation.

8. The control apparatus for a continuously variable transmission according to claim 1, wherein the flow control output is the orifice area of the operating fluid supply and discharge device.

9. The control apparatus for a continuously variable transmission according to claim 1, further comprising a gear ratio detection device which detects the gear ratio of the continuously variable transmission, wherein the fluid volume estimation device stops estimating a change in operating fluid volume within the gear change mechanism if the gear ratio falls outside a preset range.

10. The control apparatus for a continuously variable transmission according to claim 1, wherein the hydraulic control signal calculation device includes a feedforward control device which calculates a feedforward manipulated variable to be sent to the operating fluid supply and discharge device, based on the hydraulic control signal to flow control output characteristic map and wherein control by the feedforward control device is disabled until the correction device completes correction of the hydraulic control signal to flow control output characteristic map.

11. The control apparatus for a continuously variable transmission according to claim 10, wherein control by the feedforward control device is disabled under those operating conditions to which correction of the hydraulic control signal to flow control output characteristic map by the correction device is not applicable.

12. The control apparatus for a continuously variable transmission according to claim 10, further comprising a fluid temperature measurement device which measures operating fluid temperature, wherein control by the feedforward control device is disabled under those operating fluid temperatures to which correction of the hydraulic control signal to flow control output characteristic map by the correction device is not applicable.

13. The control apparatus for a continuously variable transmission according to claim 1, wherein the hydraulic control signal calculation device includes a feedforward control device which calculates a feedforward manipulated variable to be sent to the operating fluid supply and discharge device based on the hydraulic control signal to flow control output characteristic map and a feedback control device which calculates a feedback manipulated variable to be sent to the operating fluid supply and discharge device and wherein control by the feedforward control device is disabled and control by the feedback control device is enabled until the correction device completes correction of the hydraulic control signal to flow control output characteristic map.

14. The control apparatus for a continuously variable transmission according to claim 13, wherein control by the feedforward control device is disabled under those operating conditions to which correction of the hydraulic control signal to flow control output characteristic map by the correction device is not applicable.

15. The control apparatus for a continuously variable transmission according to claim 13, further comprising a fluid temperature measurement device which measures operating fluid temperature, wherein control by the feedforward control device is disabled under those operating fluid temperatures to which correction of the hydraulic control signal to flow control output characteristic map by the correction device is not applicable.

16. The control apparatus for a continuously variable transmission according to claim 1, wherein the hydraulic control signal calculation device includes a feedforward control device which calculates a feedforward manipulated variable to be sent to the operating fluid supply and discharge device based on the hydraulic control signal to flow control output characteristic map, a feedback control device which calculates a feedback manipulated variable to be sent to the operating fluid supply and discharge device and a weight setting device which specifies weights for feedforward and feedback manipulated variables and wherein the weight for feedforward manipulated variable is increased in accordance with the progress of correction of the hydraulic control signal to flow control output characteristic map by the correction device.

17. The control apparatus for a continuously variable transmission according to claim 16, wherein control by the feedforward control device is disabled under those operating conditions to which correction of the hydraulic control signal to flow control output characteristic map by the correction device is not applicable.

18. The control apparatus for a continuously variable transmission according to claim 16, further comprising a fluid temperature measurement device which measures operating fluid temperature, wherein control by the feedforward control device is disabled under those operating fluid temperatures to which correction of the hydraulic control signal to flow control output characteristic map by the correction device is not applicable.

19. The control apparatus for a continuously variable transmission according to claim 1, wherein the hydraulic control signal calculation device includes a feedback control device which calculates a feedback manipulated variable to be sent to the operating fluid supply and discharge device and wherein feedback gain for the feedback control device is changed in accordance with the progress of correction of the hydraulic control signal to flow control output characteristic map by the correction device.

20. The control apparatus for a continuously variable transmission according to claim 19, wherein a feedback gain for the feedback control device equal to or lower than a predetermined value is specified under those operating conditions to which correction of the hydraulic control signal to flow control output characteristic map by the correction device is not applicable.

21. The control apparatus for a continuously variable transmission according to claim 19, further comprising a fluid temperature measurement device which measures operating fluid temperature, wherein a feedback gain for the feedback control device equal to or lower than a predetermined value is specified under those operating fluid temperatures to which correction of the hydraulic control signal to flow control output characteristic map by the correction device is not applicable.

22. A control apparatus for a continuously variable transmission which controls gear ratio by using an operating fluid supply and discharge device to change the flow rate of operating fluid entering and leaving a gear change mechanism, the control apparatus comprising:
 a hydraulic control signal calculation device which calculates a hydraulic control signal output to the operating fluid supply and discharge device;
 a fluid flow detection device which detects the flow rate of operating fluid entering and leaving the gear change mechanism at a predetermined timing during the gear change operation;
 a fluid flow estimation device which estimates the flow rate of operating fluid entering and leaving the gear change mechanism at the predetermined timing based on the hydraulic control signal; and
 a correction device which corrects a hydraulic control signal to flow control output characteristic map for the operating fluid supply and discharge device, based on the deviation of the value detected by the fluid flow detection device from the value estimated by the fluid flow estimation device.

23. The control apparatus for a continuously variable transmission according to claim 22, wherein the correction device further corrects a hydraulic control signal value when flow begins to occur at the operating fluid supply and discharge device, based on the hydraulic control signal and the value detected by the fluid flow detection device.

24. The control apparatus for a continuously variable transmission according to claim 23, wherein the correction device corrects a hydraulic control signal value when flow begins to occur at the operating fluid supply and discharge device, based on the hydraulic control signal, the value detected by the fluid flow detection device and a dynamic characteristic model for the hydraulic control signal with respect to the flow control output.

25. The control apparatus for a continuously variable transmission according to claim 22, wherein the fluid flow estimation device includes a differential pressure detection device detecting the difference between operating fluid pressures anterior and posterior to the operating fluid supply and discharge device, the fluid flow estimation device estimating the flow rate of operating fluid entering and leaving the gear change mechanism, based on the hydraulic control signal and the value detected by the differential pressure detection device.

26. The control apparatus for a continuously variable transmission according to claim 25, wherein the fluid flow estimation device estimates the flow rate of operating fluid entering and leaving the gear change mechanism, based on the hydraulic control signal, the value detected by the differential pressure detection device and a dynamic characteristic model for the hydraulic control signal with respect to the flow control output.

27. The control apparatus for a continuously variable transmission according to claim 25, wherein the gear change mechanism comprises a primary pulley to which driving torque is transferred from a prime mover, a secondary pulley which transfers driving torque to load and a belt which is passed around the primary pulley and the secondary pulley, wherein the operating fluid supply and discharge device controls gear ratio by changing the flow rate of operating fluid entering and leaving the primary pulley, wherein the control apparatus further includes a primary rotation speed detection device which detects the primary pulley rotation speed, a secondary rotation speed detection device which detects the secondary pulley rotation speed, an input torque detection device which detects input torque transferred to the primary pulley and a secondary pressure detection device which detects operating fluid pressure within the secondary pulley and wherein the differential pressure detection device detects the difference between operating fluid pressures anterior and posterior to the operating fluid supply and discharge device, based on the values detected by the primary rotation speed detection device, the secondary rotation speed detection device, the input torque detection device and the secondary pressure detection device.

28. The control apparatus for a continuously variable transmission according to claim 22, wherein the correction device corrects the hydraulic control signal to flow control output characteristic map for the hydraulic control signal value used for estimation of flow rate of operating fluid by the fluid flow estimation device.

29. The control apparatus for a continuously variable transmission according to claim 22, further comprising a gear ratio detection device which detects the gear ratio of the continuously variable transmission, wherein the fluid flow detection device detects the flow rate of operating fluid entering and leaving the gear change mechanism, based on the amount of change in gear ratio per unit time at the predetermined timing.

30. The control apparatus for a continuously variable transmission according to claim 22, wherein the flow control output is the orifice area of the operating fluid supply and discharge device.

31. The control apparatus for a continuously variable transmission according to claim 22, wherein the hydraulic control signal calculation device includes a feedforward control device which calculates a feedforward manipulated variable to be sent to the operating fluid supply and discharge device, based on the hydraulic control signal to flow control output characteristic map and wherein control by the feedforward control device is disabled until the correction device completes correction of the hydraulic control signal to flow control output characteristic map.

32. The control apparatus for a continuously variable transmission according to claim 31, wherein control by the feedforward control device is disabled under those operating conditions to which correction of the hydraulic control signal to flow control output characteristic map by the correction device is not applicable.

33. The control apparatus for a continuously variable transmission according to claim 31, further comprising a fluid temperature measurement device which measures operating fluid temperature, wherein control by the feedforward control device is disabled under those operating fluid temperatures to which correction of the hydraulic control signal to flow control output characteristic map by the correction device is not applicable.

34. The control apparatus for a continuously variable transmission according to claim 22, wherein the hydraulic control signal calculation device includes a feedforward control device which calculates a feedforward manipulated variable to be sent to the operating fluid supply and discharge device based on the hydraulic control signal to flow control output characteristic map and a feedback control device which calculates a feedback manipulated variable to be sent to the operating fluid supply and discharge device and wherein control by the feedforward control device is disabled and control by the feedback control device is enabled until the correction device completes correction of the hydraulic control signal to flow control output characteristic map.

35. The control apparatus for a continuously variable transmission according to claim 34, wherein control by the feedforward control device is disabled under those operating conditions to which correction of the hydraulic control signal to flow control output characteristic map by the correction device is not applicable.

36. The control apparatus for a continuously variable transmission according to claim 34, further comprising a fluid temperature measurement device which measures operating fluid temperature, wherein control by the feedforward control device is disabled under those operating fluid temperatures to which correction of the hydraulic control signal to flow control output characteristic map by the correction device is not applicable.

37. The control apparatus for a continuously variable transmission according to claim 22, wherein the hydraulic control signal calculation device includes a feedforward control device which calculates a feedforward manipulated variable to be sent to the operating fluid supply and discharge device based on the hydraulic control signal to flow control output characteristic map, a feedback control device which calculates a feedback manipulated variable to be sent to the operating fluid supply and discharge device and a weight setting device which specifies weights for feedforward and feedback manipulated variables and wherein the weight for feedforward manipulated variable is increased in accordance with the progress of correction of the hydraulic control signal to flow control output characteristic map by the correction device.

38. The control apparatus for a continuously variable transmission according to claim 37, wherein control by the feedforward control device is disabled under those operating conditions to which correction of the hydraulic control signal to flow control output characteristic map by the correction device is not applicable.

39. The control apparatus for a continuously variable transmission according to claim 37, further comprising a fluid temperature measurement device which measures operating fluid temperature, wherein control by the feedforward control device is disabled under those operating fluid temperatures to which correction of the hydraulic control signal to flow control output characteristic map by the correction device is not applicable.

40. The control apparatus for a continuously variable transmission according to claim 22, wherein the hydraulic control signal calculation device includes a feedback control device which calculates a feedback manipulated variable to be sent to the operating fluid supply and discharge device and wherein a feedback gain for the feedback control device is changed in accordance with the progress of correction of the hydraulic control signal to flow control output characteristic map by the correction device.

41. The control apparatus for a continuously variable transmission according to claim 40, wherein a feedback gain for the feedback control device equal to or lower than a predetermined value is specified under those operating conditions to which correction of the hydraulic control signal to flow control output characteristic map by the correction device is not applicable.

42. The control apparatus for a continuously variable transmission according to claim 40, further comprising a fluid temperature measurement device which measures operating fluid temperature, wherein a feedback gain for the feedback control device equal to or lower than a predetermined value is specified under those operating fluid temperatures to which correction of the hydraulic control signal to flow control output characteristic map by the correction device is not applicable.

43. A control apparatus for a continuously variable transmission which controls the gear ratio by using an operating fluid supply and discharge device to change the flow rate of operating fluid, the control apparatus comprising:
a feedforward control device which uses a physical model to calculate a feedforward manipulated variable to be sent to the operating fluid supply and discharge device; and
a correction device which corrects the physical model from control results and corrects progress by repeating control; wherein
control by the feedforward control device is disabled until correction of the physical model is complete.

44. The control apparatus for a continuously variable transmission according to claim 43, wherein control by the feedforward control device is disabled under those operating conditions to which the physical model is not applicable.

45. The control apparatus for a continuously variable transmission according to claim 43, further comprising a fluid temperature measurement device which measures operating fluid temperature, wherein control by the feedforward control device is disabled under those operating fluid temperatures to which the physical model is not applicable.

46. The control apparatus for a continuously variable transmission according to claim 43, wherein the operating fluid supply and discharge device includes a flow control valve and solenoid valve, wherein a solenoid valve control value corresponding to the manipulated variable allows the solenoid valve to change the flow control valve orifice area, thus changing operating fluid flow rate, wherein the physical model is a model which brings the solenoid valve control value into correspondence with operating fluid flow rate and wherein the correction device corrects the physical model from the difference between actual operating fluid flow rate obtained through control results and flow rate of the physical model and repeats correction of the physical model.

47. A control apparatus for a continuously variable transmission which controls gear ratio by using an operating fluid supply and discharge device to change the flow rate of operating fluid, the control apparatus comprising:
a feedforward control device which uses a physical model to calculate a feedforward manipulated variable to be sent to the operating fluid supply and discharge device;
a correction device which corrects the physical model from control results and repeats correction of the physical model; and a feedback control device which calculates a feedback manipulated variable to be sent to the operating fluid supply and discharge device; wherein control by the feedforward control device is disabled and control by the feedback control device is enabled until correction of the physical model is complete.

48. The control apparatus for a continuously variable transmission according to claim 47, wherein control by the feedforward control device is disabled under those operating conditions to which the physical model is not applicable.

49. The control apparatus for a continuously variable transmission according to claim 47, further comprising a fluid temperature measurement device which measures operating fluid temperature, wherein control by the feedforward control device is disabled under those operating fluid temperatures to which the physical model is not applicable.

50. The control apparatus for a continuously variable transmission according to claim 47, wherein the operating fluid supply and discharge device includes a flow control valve and solenoid valve, wherein a solenoid valve control value corresponding to the manipulated variable allows the solenoid valve to change the flow control valve orifice area, thus changing operating fluid flow rate, wherein the physical model is a model which brings the solenoid valve control value into correspondence with operating fluid flow rate and wherein the correction device corrects the physical model from the difference between actual operating fluid flow rate obtained through control results and flow rate of the physical model and repeats correction of the physical model.

51. A control apparatus for a continuously variable transmission which controls gear ratio by using an operating fluid supply and discharge device to change the flow rate of operating fluid, the control apparatus comprising:

a feedforward control device which uses a physical model to calculate a feedforward manipulated variable to be sent to the operating fluid supply and discharge device;

a correction device which corrects the physical model from control results and repeats correction of the physical model;

a feedback control device which calculates a feedback manipulated variable to be sent to the operating fluid supply and discharge device; and a weight setting device which specifies weights for feedforward and feedback manipulated variables, wherein the weight for feedforward manipulated variable is increased in accordance with the progress of correction of the physical model.

52. The control apparatus for a continuously variable transmission according to claim 51, wherein control by the feedforward control device is disabled under those operating conditions to which the physical model is not applicable.

53. The control apparatus for a continuously variable transmission according to claim 51, further comprising a fluid temperature measurement device which measures operating fluid temperature, wherein control by the feedforward control device is disabled under those operating fluid temperatures to which the physical model is not applicable.

54. The control apparatus for a continuously variable transmission according to claim 51, wherein the operating fluid supply and discharge device includes a flow control valve and solenoid valve, wherein a solenoid valve control value corresponding to the manipulated variable allows the solenoid valve to change the flow control valve orifice area, thus changing operating fluid flow rate, wherein the physical model is a model which brings the solenoid valve control value into correspondence with operating fluid flow rate and wherein the correction device corrects the physical model from the difference between actual operating fluid flow rate obtained through control results and flow rate of the physical model and repeats correction of the physical model.

55. A control apparatus for a continuously variable transmission which controls gear ratio by using an operating fluid supply and discharge device to change the flow rate of operating fluid, the control apparatus comprising:

a feedback control device which uses a physical model to calculate a feedback manipulated variable to be sent to the operating fluid supply and discharge device; and a correction device which corrects the physical model from control results and allows correction to progress by repeating control; wherein a feedback gain for the feedback control device is changed in accordance with the progress of correction of the physical model.

56. The control apparatus for a continuously variable transmission according to claim 55, wherein a feedback gain for the feedback control device equal to or lower than a predetermined value is specified under those operating conditions to which the physical model is not applicable.

57. The control apparatus for a continuously variable transmission according to claim 55, further comprising a fluid temperature measurement device which measures operating fluid temperature, wherein a feedback gain for the feedback control device equal to or lower than a predetermined value is specified under those operating fluid temperatures to which the physical model is not applicable.

58. The control apparatus for a continuously variable transmission according to claim 55, wherein the operating fluid supply and discharge device includes a flow control valve and solenoid valve, wherein a solenoid valve control value corresponding to the manipulated variable allows the solenoid valve to change the flow control valve orifice area, thus changing operating fluid flow rate, wherein the physical model is a model which brings the solenoid valve control value into correspondence with operating fluid flow rate and wherein the correction device corrects the physical model from the difference between actual operating fluid flow rate obtained through control results and flow rate of the physical model and repeats correction of the physical model.

* * * * *